United States Patent
Khadiyev

(10) Patent No.: US 11,875,456 B2
(45) Date of Patent: Jan. 16, 2024

(54) SYSTEM AND METHOD OF GENERATING GRAFT SURFACE FILES AND GRAFT GROOM FILES AND FITTING THE SAME ONTO A TARGET SURFACE TO PROVIDE AN IMPROVED WAY OF GENERATING AND CUSTOMIZING GROOMS

(71) Applicant: Ephere Inc., Markham (CA)

(72) Inventor: Marsel Khadiyev, Ontario (CA)

(73) Assignee: Ephere, Inc., Markham (CA)

( * ) Notice: Subject to any disclaimer, the term of this patent is extended or adjusted under 35 U.S.C. 154(b) by 202 days.

(21) Appl. No.: 17/489,833

(22) Filed: Sep. 30, 2021

(65) Prior Publication Data
US 2023/0104344 A1 Apr. 6, 2023

(51) Int. Cl.
*G06T 17/20* (2006.01)

(52) U.S. Cl.
CPC .......... *G06T 17/20* (2013.01); *G06T 2200/24* (2013.01)

(58) Field of Classification Search
CPC .............................. G06T 17/20; G06T 2200/04
See application file for complete search history.

(56) References Cited

U.S. PATENT DOCUMENTS

| | | | |
|---|---|---|---|
| 6,720,962 B1 | 4/2004 | Alter | |
| 7,884,826 B1 * | 2/2011 | Baraff | G06T 13/40 345/473 |
| 10,685,499 B1 * | 6/2020 | Khadiyev | G06T 13/40 |
| 2005/0162419 A1 * | 7/2005 | Kim | G06T 15/00 382/199 |
| 2007/0279428 A1 * | 12/2007 | Bruderlin | G06T 13/40 345/581 |
| 2007/0291043 A1 * | 12/2007 | Bruderlin | G06T 15/30 345/581 |
| 2011/0063291 A1 * | 3/2011 | Yuksel | G06T 17/20 345/420 |
| 2015/0269706 A1 * | 9/2015 | Popovic | G06T 3/0093 345/646 |
| 2018/0088538 A1 * | 3/2018 | Tian | G05B 23/0297 |

FOREIGN PATENT DOCUMENTS

CA 2772530 3/2011

OTHER PUBLICATIONS

Mesit, Jaruwan. "Modeling and simulation of soft bodies." (2010).*

* cited by examiner

*Primary Examiner* — Sultana M Zalalee
(74) *Attorney, Agent, or Firm* — Patrick Stanzione; Stanzione & Associates, PLLC

(57) ABSTRACT

A method and system to create a versatile graft surface and at least one corresponding graft groom having the versatile graft surface as a base, to fit and transform the versatile graft surface onto a target surface and process the created graft groom into a modifiable hair model after the versatile graft surface is transformed onto the target surface.

23 Claims, 6 Drawing Sheets

FIG. 4C
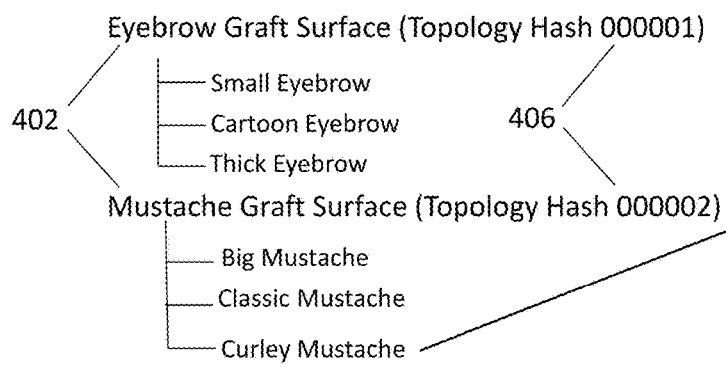
FIG. 4D
FIG. 4E
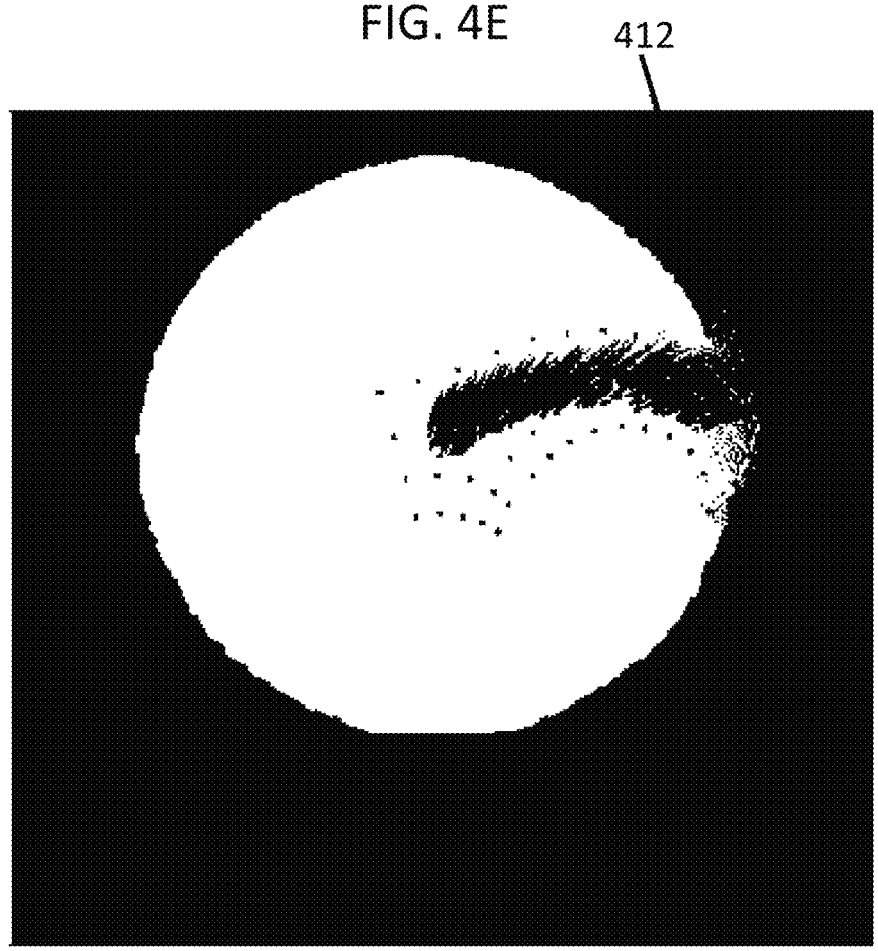

SYSTEM AND METHOD OF GENERATING GRAFT SURFACE FILES AND GRAFT GROOM FILES AND FITTING THE SAME ONTO A TARGET SURFACE TO PROVIDE AN IMPROVED WAY OF GENERATING AND CUSTOMIZING GROOMS

STATEMENT REGARDING FEDERALLY SPONSORED RESEARCH OR DEVELOPMENT

Not applicable.

COPYRIGHT NOTICE

A portion of this disclosure contains material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever. 37 C.F.R 1.71(d).

BACKGROUND OF THE INVENTIVE CONCEPT

1. Field of the Invention

The present inventive concept relates generally to the art of computer graphics generation, and more particularly to the art of computer graphics generation of graft groom files and an improved process of fitting the generated graft groom files onto a target surface which provides a faster and more versatile customization thereof.

2. Description of the Related Art

Hair in computer graphics is usually added on top of a surface representing a character's skin (i.e., a base surface), which is often a small portion of a character such as, for example, the character's scalp, eyebrow area, or chin. This base surface can be represented as a mesh of connected vertices [9] or a parametric curve surface such as a Non-uniform Rational B-spline (NURBS) or a Bezier surface [11]. Each type of base surface representation has a way to uniquely identify a surface point (surface coordinate) independent of the surface's geometric representation [12,13,14]. Hair strands representation is generally comprised of a set of root points (roots) derived from the base surface using surface coordinates (a hair model surface).

During evaluation of a hair's shape from the hair model surface, surface coordinates are used in tandem with the base surface to derive information from the base surface, such as the three-dimensional (3d) cartesian positions of the hair strand roots, texture coordinates of each strand, and the surface normal vectors at each strand's root. The hair strand shapes are then defined starting at each root point and following one or more strand points. An example of this process is provided at U.S. Pat. No. 6,720,962, titled: "Hair generation and other natural phenomena with surface derived control volumes in computer graphics and animation." There are then many ways to subsequently calculate the strand shapes, such as using a set of volumes (see for example, Canadian Patent No.: CA 2,772,530, titled "Hair meshes"), or using vector maps (see, for example: "Fur-Guides Painter:" https://www.kinematiclab.com/products/furguides-painter; and "Surface Comb operator, Ornatrix; "https://ephere.com/plugins/autodesk/maya/ornatrix/docs/3/ Surface Comb Operator.ht ml), or by direct artistic input (see, for example, "Edit Guides operator, Ornatrix:" (https:// ephere.com/plugins/autodesk/maya/ornatrix/docs/3/Edit Guides Operator.html), and using procedural algorithms (see, for example, "GROOMING AND RENDERING REALISTIC HAIR:" https://www.sidefx.com/tutorials/ grooming-and-rendering-realistic-hair/, and "Houdini hair generator operator:" https://www.sidefx.com/docs/houdini/ nodes/obj/hairgen.html). Generally, all methods for generating and storing a digital character hair model can be condensed down to the aforementioned steps of root point placement on a base surface and strand shape generation from those roots.

The methods used for creating roots on a base surface usually involve a user painting a two-dimensional (2d) density texture map which corresponds to texture coordinates on the base surface. The 2d density texture map is used as a probability distribution function to determine where to generate roots and the spatial frequency of the generated roots. Examples of this procedure can be found at: "Density Maps" (https://hairrendering.wordpress.com/tag/density-map/) and "VRayFur" (https://docs.chaosgroup.com/display/VMAX/VRayFur). For the hair model to remain procedural (i.e., to not explicitly store all roots after their creation) such density texture maps need to be stored together with the model. Other maps may be required to control various other aspects of generated hair, such as the hair's length, shape, and thickness. See "Controlling Maya's XGen Primitives with a Texture Map:" (https://lesterbanks.com/2014/02/controlling-mayas-xgen-primitives-texture-map/). Each map has to be specifically tailored for its respective base surface and is usually created by an artist separately for each character.

The methods used for defining the shape of the hair are typically also specific to each base surface. For example, a method of using surface-based directional sinks (see, for example, "Surface Comb operator, Ornatrix:" (https:// ephere.com/plugins/autodesk/maya/ornatrix/docs/3/Surface_Comb_Operator.html) relies on a static mesh topology of the base surface. Making free-hand changes to hair (see, for example, "Hair generation and other natural phenomena with surface derived control volumes in computer graphics and animation:" (https://patents.google.com/patent/U.S. Pat. No. 6,720,962B1) or "GROOMING AND RENDERING REALISTIC HAIR:" (https://www.sidefx.com/tutorials/ grooming-and-rendering-realistic-hair/)) is reliant on the currently used base surface. In procedural hair models, as more dependent operators are added to the hair's evaluation graph (see, for example, "Dependency graph:" (https:// en.wikipedia.org/wiki/Dependency_graph)) the reliance on a consistent base surface increases. As such, creating a new hair model for a digital character is a process which involves careful planning, experience with the specific workflow of current hair software, and time to set up proper texture maps, shape modifications, and procedural operators. These requirements force a digital grooming artist to set up new hair models for each of their characters even if the overall structure and process is identical between characters. Furthermore, a single character may require many hair models, such as a model for hair, for eyebrows, for eyelashes, for a beard, for a mustache, etc.

The present state of the art for reusing previously made hair models relies on re-creating a hair generation algorithm on top of new base surfaces. See, for example, "Ornatrix groom presets:" (https://ephere.com/plugins/maxon/c4d/ornatrix/docs/l/Groom_Presets.html), or "Ornatrix hair presets:" (https://ephere.com/plugins/autodesk/max/ornatrix/ docs/6/Hair_Presets_Object.html), or "MetaHuman hair creator guide:" (https://docs.metahuman.unrealengine.com/en-US/UserGuide/Hair/). These approaches are mostly targeted at reproducing a general look for shorter fur and feathers, and cannot reproduce complete user-styled hair styles that are localized on different parts of a character. Some methods attempt to provide a guide object to allow fitting a hair style onto a character (see, for example, "Ornatrix hair presets:" (https://ephere.com/plugins/autodesk/max/ornatrix/docs/6/Hair_Presets_Object.html), but such methods fall short of being universally useful due to an inability to precisely fit user-defined hair shapes onto novel base meshes. Approaches in:

a) "Ornatrix hair presets:" (https://ephere.com/plugins/autodesk/max/ornatrix/docs/6/Hair_Presets_Object.html); and b) "Unreal Engine Hair and Fur whitepaper:" (https://www.unrealengine.com/en-US/blog/realistic-hair-and-fur-with-unreal-engine-get-the-white-paper)

adopt a new base mesh from previously defined hair roots by projecting the positions of the roots onto new base surfaces in object space. This process loses the procedural nature of root re-generation and poorly adopts any new base surfaces which do not match the proportions of the base surface used to generate the hair presets.

Placing a surface model onto another surface model is frequently used in computer graphics to perform mesh retopology (see, for example, "Laying mesh over another mesh:" (https://ephere.com/plugins/autodesk/max/ornatrix/docs/6/Hair_Presets_Object.html), or "Houdini TopoTransfer:" (https://www.sidefx.com/docs/houdini/nodes/sop/topotransfer.html)) or to place decals for texturing and increasing model surface detail (see, for example, "DecalMachine:" (https://blender-addons.org/product/decals-for-decalmachine/)). There are various ways of controlling the projection and placement of one mesh onto another, such as by using temporary surface handles (see, for example, "Poly strips part with handles, relax, tweak retopology:" (https://blendermarket.com/products/retopoflow/)) as helpers. Polygon meshes are also frequently deformed to conform to another mesh's shape during animation (see, for example, "Shrinkwrap modifier:" (https://docs.blender.org/manual/en/latest/modeling/modifiers/deform/shrinkwrap.html) or "tyConform:" (https://docs.tyflow.com/tyflow_modifiers/tyConform/)) after being placed. The placed surface is either merged with the base surface by combining its geometrical data, or kept as a derived surface and its geometry updated when the base surface geometry changes (see, for example, "DecalMachine:" (https://blender-addons.org/product/decals-for-decalmachine/)), or replaces the base surface entirely (see, for example, "Houdini TopoTransfer:" (https://www.sidefx.com/docs/houdini/nodes/sop/topotransfer.html)). The above-referenced methods are only useful directly for their narrow respective purposes (e.g. mesh retopology, texture decal placement, and surface instancing of geometry) because the purpose of the projected surface, once placed, is completed. Furthermore, the models used by the above-referenced methods are stored and referenced using a custom format and logic often incompatible with any other software, thus reducing their overall value and increasing the risk of losing the models if the software is changed by a user.

"Reallusion's Hair Builder:" (https://www.reallusion.com/ContentStore/Character-Creator/Pack/Hair-Builder/, https://www.reallusion.com/character-creator/hair.html?utm_source=2106-3_RLnews&utm_medium=email&utm_campaign=newsletter&utm_term=text1.1, https://www.youtube.com/watch?v=GaXJiUrIHcE&t=1s) also attempts to provide a way to quickly create hair styles by using pre-modeled parts of hair and placing them onto characters. Their hair models, however, must be pre-fabricated and converted to polygon meshes with textures. They must also closely match their character geometry. In order to alter and customize the shape of the hair model after placement onto a target character, they use morphing to modify the hair mesh geometry. This approach is very limiting and is unable to modify the shapes and behaviors of individual strands. Furthermore, the hair is placed onto a character and is then attached using geometric transformation constraints, rather than having individual strands being attached to a base surface. This prevents more complex scenarios, especially for shorter hair and fur, where a target character's geometry deforms non-uniformly. Finally, the approach used in this process is limited to human character heads and would require significant effort to support other body parts as well as arbitrary target meshes.

Accordingly, there is a need in the art of computer graphics generation for a process that speeds up the creation of hair models for digital characters by reusing previously made hair models on any other desired digital characters.

There is also a need in the art of computer graphics generation for a process that simplifies the creation of hair models for digital characters by reusing previously made hair models on any other desired digital characters.

There is also a need in the art of computer graphics generation for reducing the steps required for creating grooms.

There is also a need in the art of computer graphics generation to provision for general reuse of grooms while also allowing reconfiguration of the grooms through parameters to achieve very specific target looks.

There is also a need in the art of computer graphics generation to provide a non-destructive approach whereby a whole groom style or just the groom's parameters can be modified at any time after placement thereof, such that the artistic input and look development experimentation is maximized while the time-consuming initial placement process is minimized.

SUMMARY OF THE PRESENT INVENTIVE CONCEPT

The present general inventive concept provides a method to speed up and simplify the creation of hair models for digital characters by reusing previously made hair models on any other desired digital characters.

The present general inventive concept also provides a method to utilize existing hair modeling and generation methods, which allows this method to fit into, and extend, current state of the art grooming software.

The present general inventive concept also provides for enabling and encouraging organization and reuse of grooms according to their intended purpose by categorizing groom surfaces base on their topology.

The present general inventive concept also provides a non-destructive approach to creating hair models whereby a whole groom style or just the groom's parameters can be modified at any time after placement thereof, thus maximizing the artistic input and look development experimentation while minimizing the time-consuming initial placement process.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a method of fitting a graft surface onto a target surface for processing a graft groom corresponding with the graft surface on the target surface into hair models, the method can include: creating at least one graft surface file from a pre-modeled surface model by calculating a topology hash of the pre-modeled surface model and defining at least first and second fit handles of the surface model to create a graft surface and storing the graft surface together with a graft surface description in the at least one graft surface file within a graft surface library to be selected from the graft surface library; creating at least one graft groom corresponding with each created graft surface by generating a groom model using a set of operators configured to generate and modify a hair model from the corresponding created graft surface and storing the groom model, calculated topology hash of the graft surface and a description of the graft groom in a graft groom file within a graft groom library to be selected from the graft groom library; selecting a target surface to generate a hair model thereon and aligning the created graft surface over the target surface on a GUI; specifying a first surface coordinate on the target surface below the first fit handle on the graft surface to define a first fit handle on the target surface and specifying a second surface coordinate on the target surface below the second fit handle on the graft surface to define a second fit handle on the target surface; generating a graft surface coordinate transformation matrix Mg; generating a target surface coordinate transformation matrix Mt; generating a scaling factor between the graft surface and the target surface; multiplying the graft surface coordinate transformation matrix Mg by the scaling factor; generating a graft to target transformation matrix Mgt by multiplying the inverse of the target surface coordinate transformation matrix Mt by the result of the multiplication of the graft surface coordinate transform matrix Mg and the scaling factor; multiplying geometric coordinates of the graft surface by the graft to target transform matrix Mgt to convert the graft surface geometric coordinates to target surface geometric coordinates; projecting the target surface geometric coordinates onto the target surface; and selecting from the graft groom library at least one of the created graft grooms corresponding with the selected graft surface to be processed on the target surface.

In an exemplary embodiment, the generating a graft surface coordinate matrix Mg can include: calculating right Rg, forward Fg and up Ug vectors for the first fit handle of the graft surface, calculating a point vector Pg for the first fit handle of the graft surface using 3D cartesian coordinates of the first fit handle and applying normalized components of the right Rg, forward Fg and up Ug vectors and the 3D cartesian coordinates of the point vector Pg of the first fit handle of the graft surface into a matrix Mg; the generating a target surface coordinate transformation matrix Mt can include: calculating right Rt, forward Ft and up Ut vectors for the first fit handle of the target surface, calculating a point vector Pt for the first fit handle of the target surface using 3D cartesian coordinates of the first fit handle and applying normalized components of the right Rt, forward Ft and up Ut vectors and the 3D cartesian coordinates of the point vector Pt of the first fit handle of the target surface into a matrix Mt; and the generating a scaling factor can include: dividing a length of the right vector Rg by a length of the right vector Rt.

In another exemplary embodiment, the method the defining at least first and second fit handles on the corresponding surface model can include selecting a first surface coordinate on the surface model as a first fit handle and selecting a second surface coordinate on the surface model as a second fit handle.

In another exemplary embodiment, the creating at least one graft surface file from a corresponding basic surface model can include creating a plurality of graft surfaces and storing the plurality of graft surfaces into the graft surface library displayable on the GUI for selection of one of the stored graft surfaces to be fitted and transformed onto a target surface.

In still another exemplary embodiment, the creating at least one graft groom corresponding with each created graft surface can include creating a plurality of graft grooms corresponding with a created graft surface and storing the plurality of graft grooms into the graft groom library displayable on the GUI for selection therefrom to be processed on the target surface in which the corresponding graft surface is fitted and transformed thereon.

In still another exemplary embodiment, the topology hash of the pre-modeled surface model can be calculated by combining vertices of polygons forming the surface model into an array of integer numbers and converting the array into a single 64-bit integer using a hash algorithm.

In still another exemplary embodiment, the calculating right, forward and up vectors for the first fit handle of the graft surface and calculating a point vector for the first fit handle of the graft surface can be performed by: subtracting the geometric points of the surface coordinates of the two fit handles on the graft surface to obtain the right vector Rg; obtaining a graft surface normal vector at each of the two fit handle coordinates and averaging the two graft surface normal vectors to obtain the forward vector Fg; multiplying the right vector and the forward vector to obtain the up vector Ug; and using the 3D cartesian surface coordinates of the first fit handle to obtain the point vector Pg.

In yet another exemplary embodiment, the graft surface coordinate transformation matrix Mg can be generated by setting the normalized right vector coordinates to be a first row of a matrix, setting the normalized forward vector coordinates to be a second row of the matrix, setting the normalized up vector coordinates to be a third row of the matrix and setting the coordinates of the point vector to be a fourth row of the matrix.

In yet another exemplary embodiment, the calculating right, forward and up vectors for the first fit handle of the target surface and calculating a point vector for the first fit handle of the target surface can be performed by: subtracting the geometric points of the target coordinates of the two fit handles on the target surface to obtain the right vector Rt; obtaining a target surface normal vector at each of the two fit handle coordinates and averaging the two target surface normal vectors to obtain the forward vector Ft; multiplying the right vector Rt and the forward vector Ft to obtain the up vector Ut; and using the 3D cartesian surface coordinates of the first fit handle to obtain the point vector Pt.

In yet another exemplary embodiment, the target surface coordinate transformation matrix Mt can be generated by setting the normalized right vector Rt coordinates to be a first row of a matrix, setting the normalized forward vector Ft coordinates to be a second row of the matrix, setting the normalized up vector Ut coordinates to be a third row of the matrix and setting the coordinates of the point vector Pt to be a fourth row of the matrix.

In still another exemplary embodiment, a graft groom library of the created graft grooms corresponding with the selected graft surface can be displayed on the GUI after the selected graft surface is transformed onto the target surface for selecting a desired graft groom to be processed on the target surface.

The foregoing and/or other features and utilities of the present general inventive concept may also be achieved by providing a system for fitting a graft surface onto a target surface and processing a graft groom corresponding with the graft surface on the target surface into hair models, the system comprising a computer processor and GUI configured to perform the processes including importing a pre-modeled surface model into a computer processor operating system configured to display, generate and modify hair models on target surfaces of digital characters, as well as display and process other digital character graphics; creating at least one graft surface file from the imported pre-modeled surface model by automatically calculating a topology hash of the pre-modeled surface model and defining at least first and second fit handles of the surface model displayed on a GUI using an interactive pointing device, combing the topology hash and fit handles to create a graft surface, and storing the graft surface together with a corresponding graft surface description as a graft surface file in a memory within a graft surface library to be selected therefrom; creating at least one graft groom corresponding with each created graft surface by generating a groom model using a set of operators configured to generate and modify a hair model from the corresponding created graft surface and storing the groom model, calculated topology hash of the graft surface and a description of the graft groom in a graft groom file within a graft groom library to be selected therefrom; selecting a target surface to generate a hair model thereon and aligning the created graft surface over the target surface on the GUI using the pointing device; specifying a first surface coordinate on the target surface below the first fit handle on the graft surface to define a first fit handle on the target surface and specifying a second surface coordinate on the target surface below the second fit handle on the graft surface to define a second fit handle on the target surface; generating a graft surface coordinate transformation matrix Mg; generating a target surface coordinate transformation matrix Mt; generating a scaling factor between the graft surface and the target surface; multiplying the graft surface coordinate transformation matrix Mg by the scaling factor; generating a graft to target transformation matrix Mgt by multiplying the inverse of the target surface coordinate transformation matrix Mt by the result of the multiplication of the graft surface coordinate transform matrix Mg and the scaling factor; multiplying geometric coordinates of the graft surface by the graft to target transform matrix Mgt to convert the graft surface geometric coordinates to target surface geometric coordinates; projecting the target surface geometric coordinates onto the target surface; and selecting at least one of the created graft grooms corresponding with the selected graft surface to be processed on the target surface.

In exemplary embodiment, the generating a graft surface coordinate transformation matrix Mg can include: calculating right Rg, forward Fg and up Ug vectors for the first fit handle of the graft surface, calculating a point vector Pg for the first fit handle of the graft surface using 3D cartesian coordinates of the first fit handle and applying the normalized components of the Rg, Fg and Ug vectors and the 3D cartesian coordinates of the Pg vector of the first fit handle of the graft surface to a matrix Mg; the generating a target surface coordinate transformation matrix Mt can include: calculating right Rt, forward Ft and up Ut vectors for the first fit handle of the target surface, calculating a point vector Pt for the first fit handle of the target surface using 3D cartesian coordinates of the first fit handle and applying the normalized components of the Rt, Ft and Ut vectors and the 3D cartesian coordinates of the Pt vector of the first fit handle of the target surface to a matrix Mt; and the generating a scaling factor can include dividing a length of the right vector Rg of the graft surface by a length of the right vector Rt of the target surface.

In another exemplary embodiment, the process of defining at least first and second fit handles on the corresponding surface model can include displaying the surface model on the GUI and selecting a first surface coordinate on the surface model with the pointing device as a first fit handle and selecting a second surface coordinate on the surface model with the pointing device as a second fit handle.

In another exemplary embodiment, the creating at least one graft surface file from a corresponding basic surface model can include creating a plurality of graft surfaces and storing the plurality of graft surfaces into the graft surface library displayable on the GUI for selection of one of the stored graft surfaces to be fitted and transformed onto a target surface.

In still another exemplary embodiment, the processor the creating at least one graft groom corresponding with each created graft surface can include creating a plurality of graft grooms corresponding with a created graft surface and storing the plurality of graft grooms into the graft groom library displayable on the GUI for selection therefrom to be processed on the target surface in which the corresponding graft surface is fitted and transformed thereon.

In yet another exemplary embodiment, the topology hash of the pre-modeled surface model can be calculated by combining vertices of polygons forming the surface model into an array of integer numbers and converting the array into a single 64-bit integer using a hash algorithm.

In still another exemplary embodiment, the calculating right, forward and up vectors for the first fit handle of the graft surface and calculating a point vector for the first fit handle of the graft surface can be performed by: subtracting the geometric points of the surface coordinates of the two fit handles on the graft surface to obtain the right vector Rg; obtaining a graft surface normal vector at each of the two fit handle coordinates and averaging the two graft surface normal vectors to obtain the forward vector Fg; multiplying the right vector and the forward vector to obtain the up vector Ug; and using the 3D cartesian surface coordinates of the first fit handle to obtain the point vector Pg.

In yet another exemplary embodiment, the graft surface coordinate transformation matrix Mg can be generated by setting the normalized right vector coordinates to be a first row of a matrix, setting the normalized forward vector coordinates to be a second row of the matrix, setting the normalized up vector coordinates to be a third row of the matrix and setting the coordinates of the point vector to be a fourth row of the matrix.

In yet another exemplary embodiment, the calculating right, forward and up vectors for the first fit handle of the target surface and calculating a point vector for the first fit handle of the target surface can be performed by: subtracting the geometric points of the target coordinates of the two fit handles on the target surface to obtain the right vector Rt; obtaining a target surface normal vector at each of the two fit handle coordinates and averaging the two target surface normal vectors to obtain the forward vector Ft; multiplying the right vector Rt and the forward vector Ft to obtain the up vector Ut; and using the 3D cartesian surface coordinates of the first fit handle to obtain the point vector Pt.

In still another exemplary embodiment, the target surface coordinate transformation matrix Mt can be generated by setting the normalized right vector Rt coordinates to be a first row of a matrix, setting the normalized forward vector Ft coordinates to be a second row of the matrix, setting the normalized up vector Ut coordinates to be a third row of the matrix and setting the coordinates of the point vector Pt to be a fourth row of the matrix.

In still another exemplary embodiment, the a graft groom library of the created graft grooms corresponding with the selected graft surface can be displayed on the GUI after the selected graft surface is transformed onto the target surface for selecting a desired graft groom to be processed on the target surface.

The foregoing and/or other features and utilities of the present general inventive concept may also be achieved by providing a non-transient computer-readable medium comprising instructions executed by a processor of a computing device to perform the following processes: creating at least one graft surface file from a pre-modeled surface model by calculating a topology hash of the pre-modeled surface model and defining at least first and second fit handles of the surface model to create a graft surface and storing the graft surface together with a graft surface description in the at least one graft surface file within a graft surface library to be selected from the graft surface library; creating at least one graft groom corresponding with each created graft surface by generating a groom model using a set of operators configured to generate and modify a hair model from the corresponding created graft surface and storing the groom model, calculated topology hash of the graft surface and a description of the graft groom in a graft groom file within a graft groom library to be selected from the graft groom library; selecting a target surface to generate a hair model thereon and aligning the created graft surface over the target surface on a GUI; specifying a first surface coordinate on the target surface below the first fit handle on the graft surface to define a first fit handle on the target surface and specifying a second surface coordinate on the target surface below the second fit handle on the graft surface to define a second fit handle on the target surface; generating a graft surface coordinate transformation matrix Mg; generating a target surface coordinate transformation matrix Mt; generating a scaling factor between the graft surface and the target surface; multiplying the graft surface coordinate transformation matrix Mg by the scaling factor; generating a graft to target transformation matrix Mgt by multiplying the inverse of the target surface coordinate transformation matrix Mt by the result of the multiplication of the graft surface coordinate transform matrix Mg and the scaling factor; multiplying geometric coordinates of the graft surface by the graft to target transform matrix Mgt to convert the graft surface geometric coordinates to target surface geometric coordinates; projecting the target surface geometric coordinates onto the target surface; and selecting from the graft groom library at least one of the created graft grooms corresponding with the selected graft surface to be processed on the target surface.

BRIEF DESCRIPTION OF THE DRAWINGS

These and/or other features and utilities of the present inventive concept will become apparent and more readily appreciated from the following description of the exemplary embodiments, taken in conjunction with the accompanying drawings of which:

FIG. 4C illustrates example graft surfaces with corresponding topology hashes to be selected by a user, according to an example embodiment of the present inventive concept;

FIG. 4D illustrates an expanded view of a graft surface with graft surface descriptions, according to an example embodiment of the present inventive concept;

FIG. 4E illustrates a 3D rendering of the graft groom selected from the graphic user interface of graft grooms illustrated in FIG. 4B;

DETAILED DESCRIPTION OF THE PREFERRED EMBODIMENTS

Figure 1:
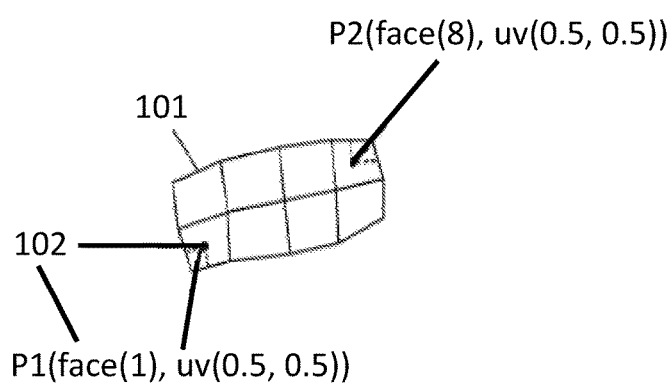
FIG. 1 illustrates a conventional graft surface for a digital character.

Reference will now be made in detail to the embodiments of the present inventive concept, examples of which are illustrated in the accompanying drawings, wherein like reference numerals refer to the like elements throughout. The embodiments are described below in order to explain the present inventive concept while referring to the figures. Also, while describing the present inventive concept, detailed descriptions about related well-known functions or configurations that may diminish the clarity of the points of the present general inventive concept are omitted.

It will be understood that although the terms "first" and "second" may be used herein to describe various elements, these elements should not be limited by these terms. These terms are only used to distinguish one element from another element. Thus, a first element could be termed a second element, and similarly, a second element may be termed a first element without departing from the overall teachings of this disclosure.

Expressions such as "at least one of," when preceding a list of elements, modify the entire list of elements and do not modify the individual elements of the list.

All terms including descriptive or technical terms which are used herein should be construed as having meanings that are obvious to one of ordinary skill in the art. However, the terms may have different meanings according to an intention of one of ordinary skill in the art, case precedents, or the appearance of new technologies. A list of definitions for terms is provided directly below, and such definitions shall take president over other extrinsic definitions of such terms. Also, some terms may be arbitrarily selected by the applicant, and in this case, the meaning of the selected terms are defined in detail directly below. Thus, the terms used herein should be defined based on the meaning of the terms from the definitions provided below together with the descriptions provided throughout the specification.

Also, when a part "includes" or "comprises" an element, unless there is a particular description contrary thereto, the part can further include other elements, not exclude other elements. In the following description, terms such as "processor" and "module" indicate a unit to process at least one function or operation, wherein the processor and unit may be embodied as hardware or software, or may be embodied by combining hardware and software.

Definitions of Technical Terms Used Throughout the Specification

Base Surface: A geometric 3D representation of some surface on which hair is generated. For example, a base surface could be a polygon mesh or a non-uniform rational B-spline (NURBS) surface.

3D modeling: The process of creation of geometric models (e.g. polygon meshes, hair models, textures) by a human artist.

Root: First end (starting) point of a hair strand, typically attached to a surface.

Common storage format: An existing, widely used file format used to store geometric data, scene graph structure, and scene graph operator descriptions on a hard-drive or in RAM memory. Examples are: Universal Scene Description, Alembic, Autodesk FBX.

Strand Data: Various information attached to a strand which defines its properties. This information may include strand's shape (as defined by its constituent vertex positions), thickness, texture coordinates, grouping information, shading information, whether a strand was deleted, and/or custom user data. This information may be defined as a single entry per-strand, as multiple entries one per each of the strand's vertices (or otherwise along its length), or using a parametric position coordinate along the strand (from 0 at its root to 1 at its tip).

Root Coordinate: A unique position of a hair strand's root on a base surface. The coordinate may be specified as relative to the base surface, for example using 2D texture coordinates or a triangle index and barycentric coordinates on said triangle, or it can be specified as a 3D coordinate within world space. The only logical requirement we impose on root coordinates is an ability find if one root coordinate is closer to another root coordinate than a third root coordinate.

Strand Data Map: A structure which stores many unique Root Coordinates and Strand Data associated with each said stored Root Coordinate. It allows quick lookup of Strand Data given a Root Coordinate, including finding one or more Strand Data closest to a given Root Coordinate. Some Root Coordinates within a Strand Data Map may not store any Strand Data, in which case they're considered "Empty".

Closest Root Coordinates: When we refer to "closest" root coordinates, this can mean closest by spatial distance or by using some other algorithm to determine which Root Coordinate is "closest" to another Root Coordinate.

DCC app: a digital content creation application, such as, for example, 3dsmax, Maya, Blender, Houdini, Cinema 4D, or any software designed for creating 3d computer graphics.

Graft surface: A surface model chosen to be the base of a graft model. A single graft surface will typically have many different graft models created from it. For example, a surface defining a general eyebrow area of a face could be a graft surface and can be used to create many different types of eyebrow shapes/models. This information may include:

a. Preview image: A simple descriptive image of the surface structure (e.g. a polygon mesh). The image is used to show an artist what the graft surface is in a visual way. For example, an eyebrow graft surface can display the graft surface mesh on top of a target surface in the area where an eyebrow would be located. The image may also show the placement and flow of the fit handles.

b. Name: A simple name of the graph surface. For example: Eyebrow, upper eyelash, lower eyelash, beard, mustache, scalp hair, etc.

c. Text description: Additional description outlining the purpose of the graft surface and its placement process. For example: A general eyebrow graft, click and drag from the inner to outer region of an eyebrow.

Groom model: An algorithm used for transforming a surface model into a hair model. It can be as simple as just containing hair strand coordinates and updating their positions to stay "attached" to the surface model. Typically, a groom model will contain a set of operators or some code which would generate hair strand shapes, texture coordinates, widths, colors, and other information procedurally.

Graft groom: A file (or some data storage structure) containing a graft surface (or just the graft surface's hash to conserve storage space) and the groom model. The graft groom file can be stored using one of many widely used DCC app interop formats (e.g. Alembic, USD) or any other proprietary format.

Graft groom library: a collection of graft groom files. Graft groom libraries can be stored together in a directory structure on a computer's hard drive or can be downloaded over a network from a known server computer.

Parametric surface: A model of a 3D surface consisting of a set of control points defining curves and sometimes additional per-point data (e.g., Bezier handles for Bezier curves) and information about connections between these points to form a surface.

Pointing device: A means for an artist to specify a screen or viewport coordinate inside a computer. For example: computer mouse, finger, stylus (for touch sensitive displays), track-pad, track-wheel. A pointing device has a way of allowing a user to "click" or "click and release" the current point (e.g. mouse button, press or double tap with finger). For multi-touch displays a point device may also be able to track and specify multiple points at the same time.

Polygon mesh: A model of a 3D surface consisting of a set of vertices (geometry) and faces connecting said vertices (topology). Mesh could consist entirely of triangle faces or contain faces with four or more vertices.

Surface model: A memory-representation of a physical surface such as a polygonal mesh, a parametric curve surface, or a function describing a surface.

Surface coordinate: Face+Barycentric, Face+UV, or parametric UV coordinate uniquely identifying a point on a mesh surface.

Surface projection: A process whereby a surface coordinate is found of a surface model for provided 3d point such that said surface coordinate geometric position is closest to said 3d point.

Target surface: Surface model onto which a graft surface is placed.

Topology hash: A simple data structure (e.g., a 32-bit or 64-bit integer or a short character string) which uniquely represents the topology (how geometric vertices/points are connected together to form a surface) of a surface model. For example, a polygon mesh would have a topology hash 32-bit integer generated for its faces. If another polygon mesh's topology hash would yield the same 32-bit integer we can conclude that the two meshes are topologically identical. These two meshes could look different since their geometric point/vertex coordinates could be different, but their surface structure would be the same. Using topology hashes a user can categorize many meshes by their topology into some data structure like a map or a table without having to compare their topological structure explicitly each time. Furthermore, using topology hashes a user can store only the topology hash integer inside a graft groom instead of storing a full graft surface model in order to conserve space.

Fit handle: A surface coordinate defining a point during graft surface fitting process to a target surface. The fitting process consists of one or more pointing device (e.g. a computer mouse, finger, stylus) clicks on a displayed target surface, each click defining some aspect of transformation of graft surface vertices into surface coordinates on target surface.

Fit handle surface transformation: Transformation of geometric coordinates from a graft surface to surface coordinates on a target surface using the graft surface fit handles and a set of surface coordinates associated to each of said fit handles on the target surface.

Hereinafter, exemplary embodiments of the present inventive concept will be described in detail with reference to the accompanying drawings.

The present inventive concept relates generally to the art of computer graphics generation, and more particularly to the art of computer graphics generation of graft groom files and an improved process of fitting the generated graft groom files onto a target surface which provides a faster and more versatile customization thereof.

FIG. 1 illustrates an example of a conventional "surface model" 101 (also referred to herein as a conventional graft model) of an eyebrow of a digital character. Reference number 102 represents a Face+Barycentric, Face+UV, or a parametric UV coordinate uniquely identifying a point on the surface model 101.

Figure 2:
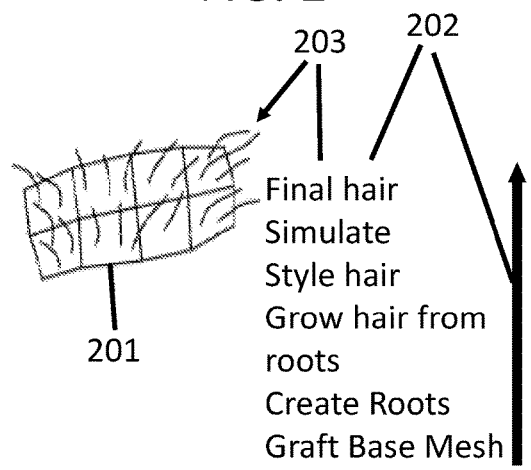
FIG. 2 illustrates the graft surface of FIG. 1 with a groom model.

FIG. 2 illustrates an example of another conventional surface model 201 of an eyebrow including a well-known "groom model" 202, also described in more detail below. As is well known in the art of digital character hair creation and grooming, a groom model is a created algorithm that is used for transforming a surface model 201 into a hair model, which is the final product of hair created for a digital character. A groom model (aka: groom algorithm) can be as simple as a set of hair strand coordinates, as well as program codes (or operators) designed for updating hair strand positions to stay attached to the base surface model. Some operators or codes may include ones that generate hair strand shapes, texture coordinates, widths, colors, and other procedural information. A "graft groom" refers to a file (or a data storage structure) containing a base surface model (or a graft surface, as described in detail below) (or just the graft surface's topology hash to conserve storage space) and the graft surface's groom model 202. Such graft groom files can be stored using a common storage format or any other proprietary storage format.

Figure 3:
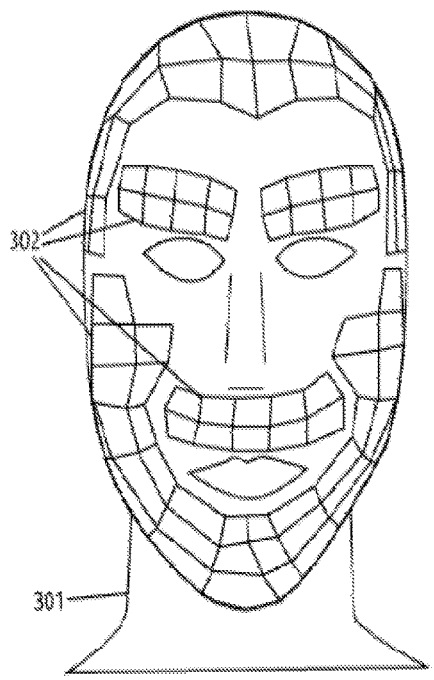
FIG. 3 illustrates a target surface including a plurality of graft grooms placed thereon.

FIG. 3 illustrates a plurality of pre-modeled surfaces models 302 that can be imported into the computer processor described herein and used to create a graft surface to be processed as described below.

Figure 4A:
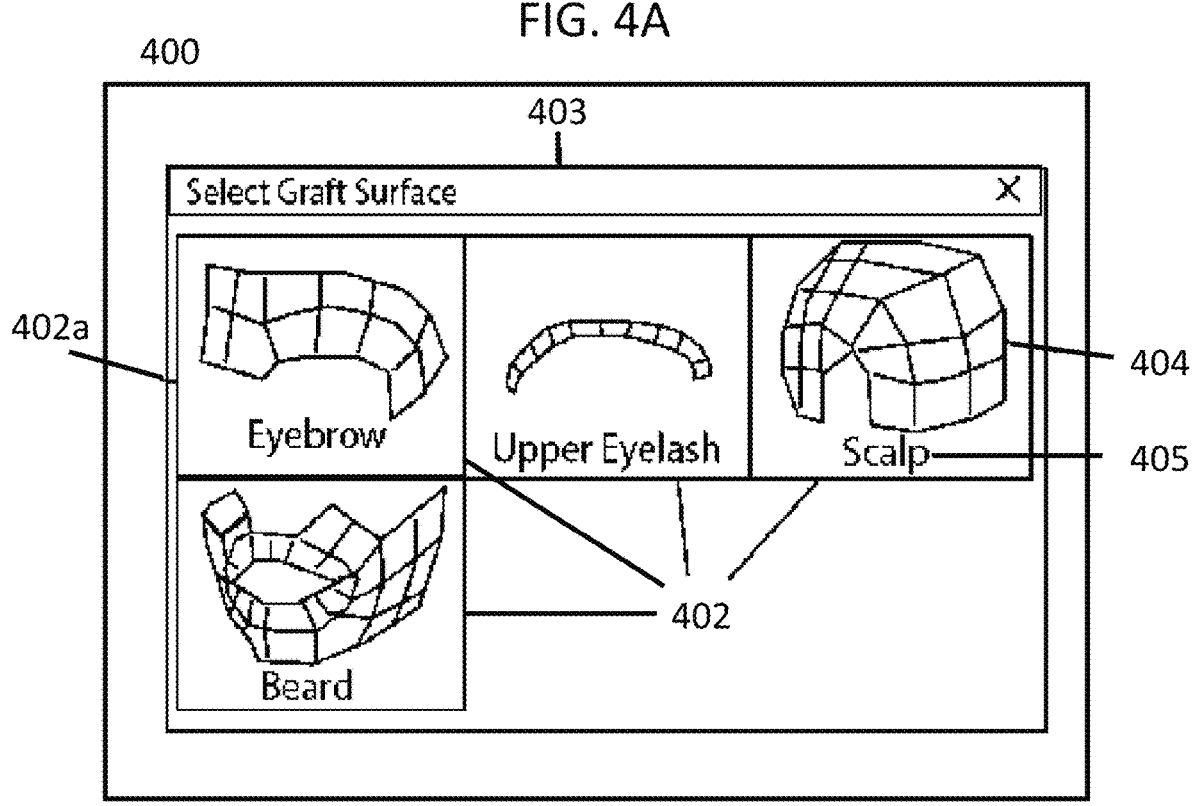
FIG. 4A illustrates a graphic user interface illustrating a plurality of graft groom surfaces to select from, according to an example embodiment of the present inventive concept.

Referring to FIG. 4A, an example embodiment of the present inventive concept provides a digital storage of a graft surface library that can be viewed on an interactive graphic user interface (GUI) 400. The GUI 400 can be associated with the computer processor described herein, which is configured to process the computer-readable codes which perform the various processes according to the present inventive concept, as described in detail below.

The graft surface library can comprise a plurality of newly created graft surfaces 402 (to be described in detail below), corresponding descriptions 405 of each of the respective created graft surfaces 402, and corresponding preview images 404 of each respective created graft surface 402. Reference number 402a illustrates an operation of selecting one of the created graft surfaces 402 (i.e., eyebrow) by a user of the GUI 400 to be processed into a hair model, according to example embodiments described below. One of a plurality of created graft surfaces 402 can be selected by placing a shaded box 402a over the desired graft surface 402 to be used, and then clicking on a "select graft surface" button 403 at the top of the list of graft surfaces 402.

Figure 4B:
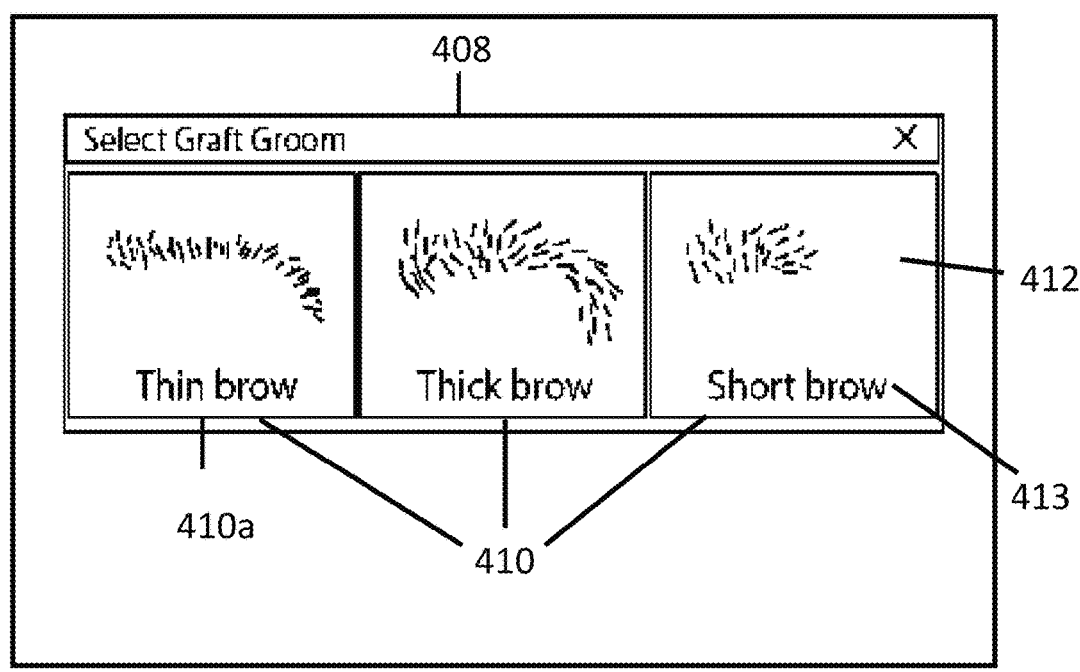
FIG. 4B illustrates the graphic user interface of FIG. 4A illustrating a plurality of graft grooms to select from, according to an example embodiment of the present inventive concept.

FIG. 4B illustrates a "graft groom library" according to an example embodiment of the present inventive concept. The graft groom library can include a plurality of graft grooms 410 created using one of a plurality of different available groom models, or groom algorithms, which are well known to those having ordinary skill in the art. See, for example, U.S. Pat. No. 6,720,962, by Alter, titled: HAIR GENERATION AND OTHER NATURAL PHENOMENA WITH SURFACE DERIVED CONTROL VOLUMES IN COMPUTER GRAPHICS AND ANIMATION. The graft groom library can also include graft groom descriptions 413 of each respective graft groom 410, and a preview image 412 of each graft groom 410.

A graft surface 402 can be created using the above-described computer processor and GUI 400 by importing and storing pre-modeled surfaces models 201, 302 from an external source, such as from a digital content creation (DCC) app, selecting one of the imported surfaces models 201, calculating a topology hash for the selected surface model 201, defining one or more "fit handles" (described in detail below) for the selected surface model 201, providing a graft surface description for the combined topology hash and fit handles, and storing the topology hash, fit handles and surface description together to define a newly created graft surface 402. This can all be accomplished through the interactive graphic user interface (GUI) 400 and corresponding computer processor.

The graft grooms 410 are created with the topology hash of a created graft surface 402 and a generated groom model using the base graft surface 402. These graft grooms 410 are then stored as a graft groom file in the graft groom library to be accessed when needed. As is well known to those of ordinary skill in the art, a groom model is an algorithm used to transform a surface model 201 (or a graft surface 402) into a hair model. Each graft groom file 410 created according to an example embodiment includes a corresponding created graft surface 402 as its base. There can be multiple graft grooms 410 having the same base graft surface 402, so long as the topology hash of the base graft surface 402 remains constant. A graft groom 410 can be selected from a plurality of graft grooms 410 displayed on the GUI 400 by placing a shaded box 410a over the desired graft groom surface 410 and clicking on a "select graft groom" button 408.

In accordance with an example embodiment, once a graft surface 402 is selected by a user to be placed on a target surface, the GUI 400 can be configured to display a corresponding graft groom library so that one of many graft grooms 410, having the selected graft surface 402 as its base, can then be selected to be processed on the target surface after the selected graft surface 402 is fitted and transformed onto the selected target surface, as described in detail below. In accordance with an alternative example embodiment, a graft groom 410 can be displayed to be selected before a graft surface 402 is fitted onto a target surface. In another example embodiment, a default graft groom 410 can be configured to be automatically selected for each created graft surface 402, such that once a graft surface 402 is selected, fitted and transformed to a target surface, a specific graft groom 410 is automatically applied to the target surface to be processed. In this example embodiment a user can change the default graft groom 410 to any other desired graft groom having the same graft surface 402 as its base.

FIG. 4C illustrates how topology hashes 406 can be stored in a file storage for the graph surfaces 402. Although the topology hashes 406 are not viewable to a user at the GUI 400, they are stored in the file storage for other purposes, such as, for example, to be used internally by algorithms, such as graft models, and for debugging. FIG. 4D illustrates how the topology hashes, as well as defined fit handles and graft surface descriptions, such as a description of each graft surface's intended location on a target surface, can be stored in a file storage.

Once a created graft surface 402 (described in detail below) is selected by a user at the graft surface library displayed on the GUI 400, as illustrated in FIG. 4A, vertices on the graft surface 402 can be chosen to be used during a process of transferring the graft surface 402 to a target surface. It is to be noted that the number of vertices (or control points for parametric surfaces) of the graft surface 402 should be kept as low as possible while defining enough detail to accommodate possible target mesh deformation.

A selected graft surface 402, which can be performed with the aid of a pointing device on the GUI 400, can then be fitted to a target surface by using "fit handles" (i.e., surface coordinates which define a point during a graft surface fitting process onto a target surface) defined on the graft surface 402. It is to be noted that all selections performed on the GUI can alternatively be performed with an interactive screen on the GUI 400 in place of using a pointing device. The interactive screen can be operated with the aid of a screen pointer or pen, or any other equivalent device for performing selections on an interactive GUI.

Figure 5:
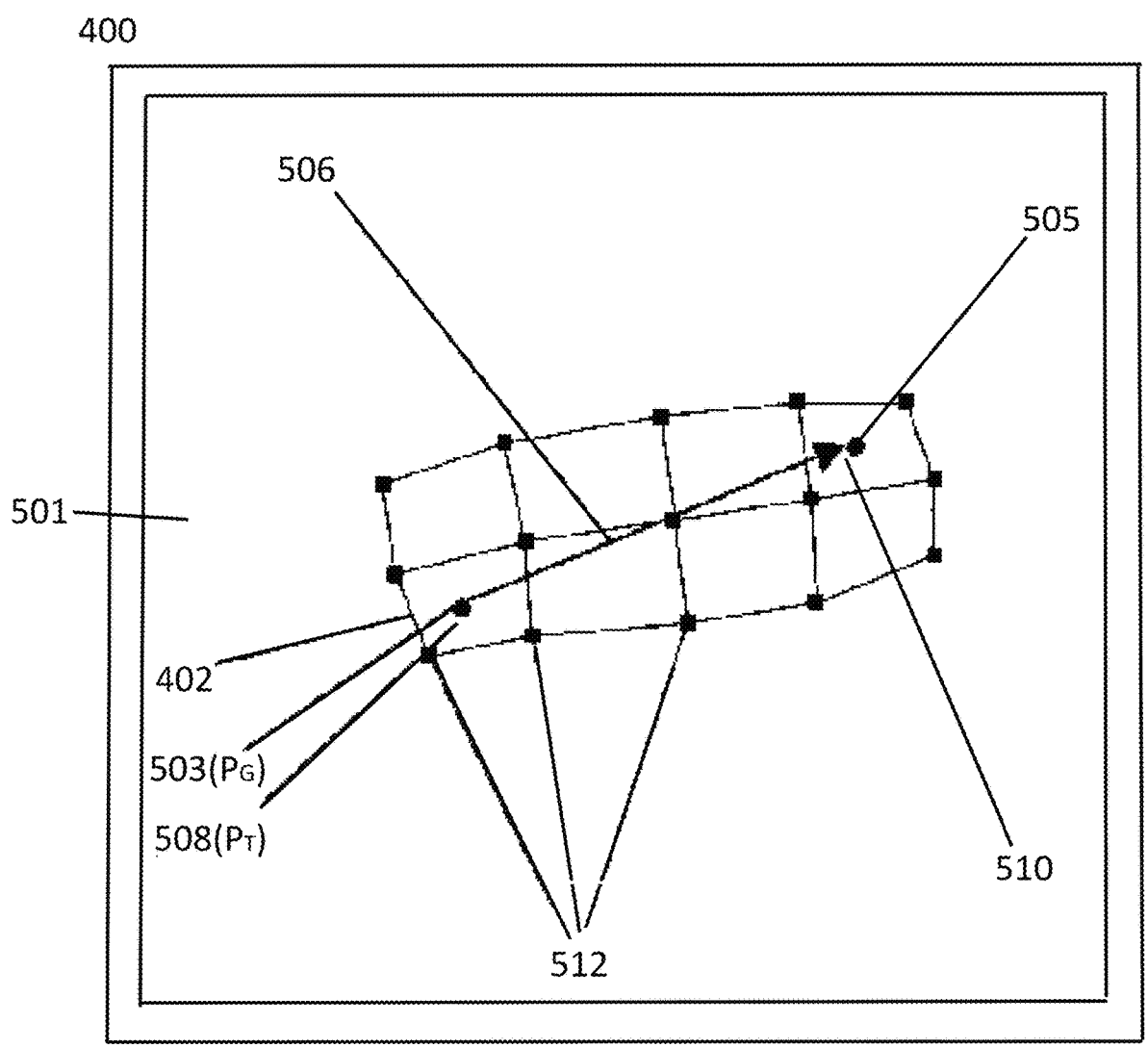
FIG. 5 illustrates a process of fitting a graft surface onto a target surface, according to an example embodiment of the present inventive concept.

FIG. 5 illustrates a display of a selected target mesh surface 501 as well as a selected graft surface 402 on a screen of the GUI 400. A plurality of different target surfaces 501 can be pre-stored in memory to be used later to create digital characters and hair models thereon. A target surface 501 and a graft surface 402 can both be selected on the GUI 400 using a pointing device to perform a fitting process, which fits a graft surface 402 onto a target surface 501. Once fit handles are defined for both a selected graft surface 402 and for a target surface 501 (both described in detail below), a transformation of the created graft surface 402 onto the target mesh surface 501 can be performed (as described in detail below), according to example embodiments of the present inventive concept.

Still referring to FIG. 5, a process of creating the graft surfaces 402 will now be described. A first specified point [503] (i.e., first surface coordinate) on the graft surface 402 can be selected with a pointing device to define a first fit handle [503] of the graft surface 402. A second specified point [505] (second surface coordinate) on the graft surface 402, can then be selected with the pointing device to define a second fit handle [505] of the graft surface 402. This process can be repeated until surface coordinates are defined for all desired fit handles of the graft surface 402. Only two fit handles will be defined in this detailed description since two fit handles are generally used to perform the fitting and transformation processes of the present inventive concept. However, one or more than two fit handles can be used to perform the processes as described herein without departing from the spirit and scope on the inventive concept. These defined fit handles [503] and [505] can then be stored together with the calculated topology hash of an imported surface model 201, as well as a graft surface description of the newly created graft surface 402. This newly created graft surface 402 can be stored in a graft surface file within the graft surface library. Additional graft surfaces 402 can be created in the same way and stored within the graft surface library so that any one of a plurality of difference graft surfaces 402 can be selected as desired to be fitted and transformed onto a target surface 501.

The fitting process (fitting a created graft surface 402 onto a target surface 501), according to an example embodiment of the present inventive concept, can be performed as follows. First, a user selects a created graft surface 402 from the graft surface library using the pointing device to be processed on the GUI 400. The user can also select a target surface 501 from a plurality of stored target surfaces and then direct the computer processor to display the selected graft surface 402 over a selected target surface 501 among a plurality of stored target surfaces. Once the graft surface 402 is placed over the target surface 501 and aligned as desired, the user can then specify a point on the target surface 501 directly below the first fit handle [503] on the graft surface 402 to define a surface coordinate on the target surface 501 to become a first fit handle [508] of the target surface 501, and then specify another point on the target surface 501 directly below the second fit handle [505] on the graft surface 402 to define a second surface coordinate on the target surface 402 to become a second fit handle [510] on the target surface 501. 402 The process of defining surface coordinates on the target surface 501 corresponding to the fit handles [503] and [505] of the graft surface 402 can be performed via the aid of dragging, clicking, and releasing operations using the pointing device, as illustrated by arrow 506 in FIG. 5. 402 During the dragging operations a line connecting the two defined surface coordinates on the target surface 501 can be displayed to illustrate directions and distances from the first surface coordinate to a second surface coordinate. This process may also be tracked when no clicks occur with the pointing device in order to obtain a temporary surface coordinate under the pointing device cursor, which can be moved across the screen of the GUI 400 as desired. A currently defined fit handle's surface coordinate can be updated with a temporary surface coordinate to display a preview of a "fitted graft surface" without committing to the step of defining the surface coordinate. A "fitted graft surface" is a graft surface 402 comprising a set of geometric points where each geometric point is located on the surface of a target surface 501. These geometric points can be kept attached to the target surface 501 by calculating geometric surface positions using surface coordinates as provided during a fit handle surface transformation, which will be discussed in more detail below.

A set of fit handle surface coordinates [503], [505], each paired with target surface coordinates [508], [510] on a target mesh surface 501 (target surface coordinates can be obtained the same way in which the graft surface coordinates are obtained), are used to transform graft surface coordinates to fitted graft surface coordinates. Reference number 512 illustrates graft surface coordinates on the graft surface 402.

Once the surface coordinates [508], [510] on the target surface 501 are defined using the fit handles [503] and [505] of the created graft surface 402, a transformation process according to an example embodiment of the present inventive concept can be performed as described below.

Figure 6:
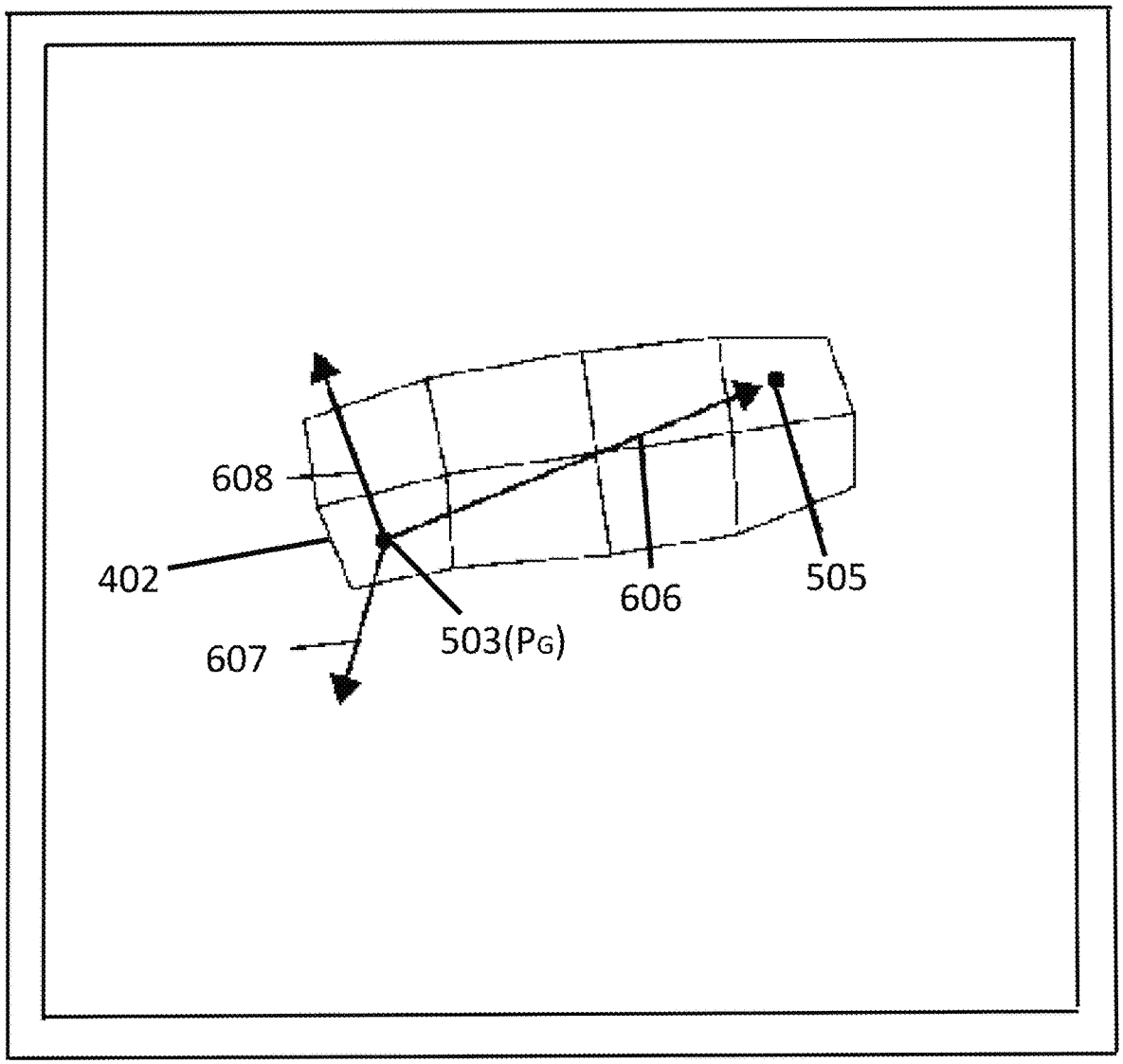
FIG. 6 illustrates a process of calculating vectors and fit handles from coordinates on a graft surface used to create a graft surface coordinate transform matrix used to fit the graft surface onto a target surface, according to an example embodiment of the present inventive concept.

FIG. 6 illustrates a process of calculating 3D vectors for points on a graft surface 402. It is to be noted that the same process is used to calculate 3D vectors for points on the target surface 501, as will be explained below. Referring to the graft surface 402 illustrated in FIG. 6, in accordance with an example embodiment, the calculated 3D vectors for the graft surface 402 can be used to obtain a graft surface coordinate transformation matrix Mg. More specifically, the two previously obtained fit handles [503], [505] on the graft surface 402 can be used to calculate a "right" 3D vector [606] (having 3 components x,y,z) by subtracting the geometric points of the surface coordinates of the two fit handles [503], [505] on the graft surface 402. A graft surface normal vector can be obtained at each of the two fit handle coordinates [503], [505] and then averaged to produce a "forward" 3D vector [607] (having 3 components x,y,z). Although the normal vector for the first fit handle [503] can be derived simply using the geometric vertices of the surface (see: https://math.stackexchange.com/questions/599803/calculating-normals-for-a-polygon-mesh-3d-computer-graphics; or https://www.khronos.org/opengl/wiki/Calculating_a_Surface_Normal), averaging the two normal vectors takes into account potential surface curvature between the two fit handles [503], [505], thus providing more accurate results. One of ordinary skill in the art will understand that a surface normal vector is generally available as the property of the surface itself (i.e., it may be stored per-face or per-vertex in-memory or on a hard drive together with the surface's face and vertex arrays). The cross product of the "right" vector R [606] and the "forward" 3D vector F [607] yields an "up" 3D vector U [608] (having 3 components x,y,z). As pointed out above, the three obtained vectors (R, F, U) [606], [607], [608] can then be used to form a "graft surface coordinate transformation matrix" Mg. For example, a 3×4 graft surface coordinate transform matrix Mg can be constructed by setting the normalized "right" vector R [606] to be the transform matrix's first row, setting the normalized "forward" vector F [607] to be the transform matrix's second row, setting the normalized "up" vector U [608] to be the transform matrix's third row, and setting a vector Pg (having 3D cartesian coordinates x, y, z) to be the transform matrix's fourth row. The 3D cartesian coordinates of vector P can be calculated by using the surface coordinate of the first fit [503] handle and using 3D cartesian positions of mesh vertices. One of ordinary skill in the art will also understand that a vector is normalized when the following condition is met: $V(x^2+y^2+z^2)=1$).

The graft surface coordinate transformation matrix Mg can be constructed from the four vectors [Rx Ry Rz], [Fx Fy Fz], [Ux Uy Uz], and [Px Py Pz]. More specifically, normalized components of vector R can form the first row of the matrix Mg, normalized components of vector F can form the second row of the matrix Mg, and normalized components of the Vector U can form the third row of the matrix Mg, while the vector Pg can form the fourth row of the matrix Mg. It is to be noted that since vector Pg represents a 3D position, it is not normalized.

The 3×4 graft surface coordinate transform matrix Mg converts a 3D coordinate in a graft surface's object space into the "world" object space when the 3D coordinate is multiplied by the graft surface coordinate transform matrix Mg.

Figure 7:
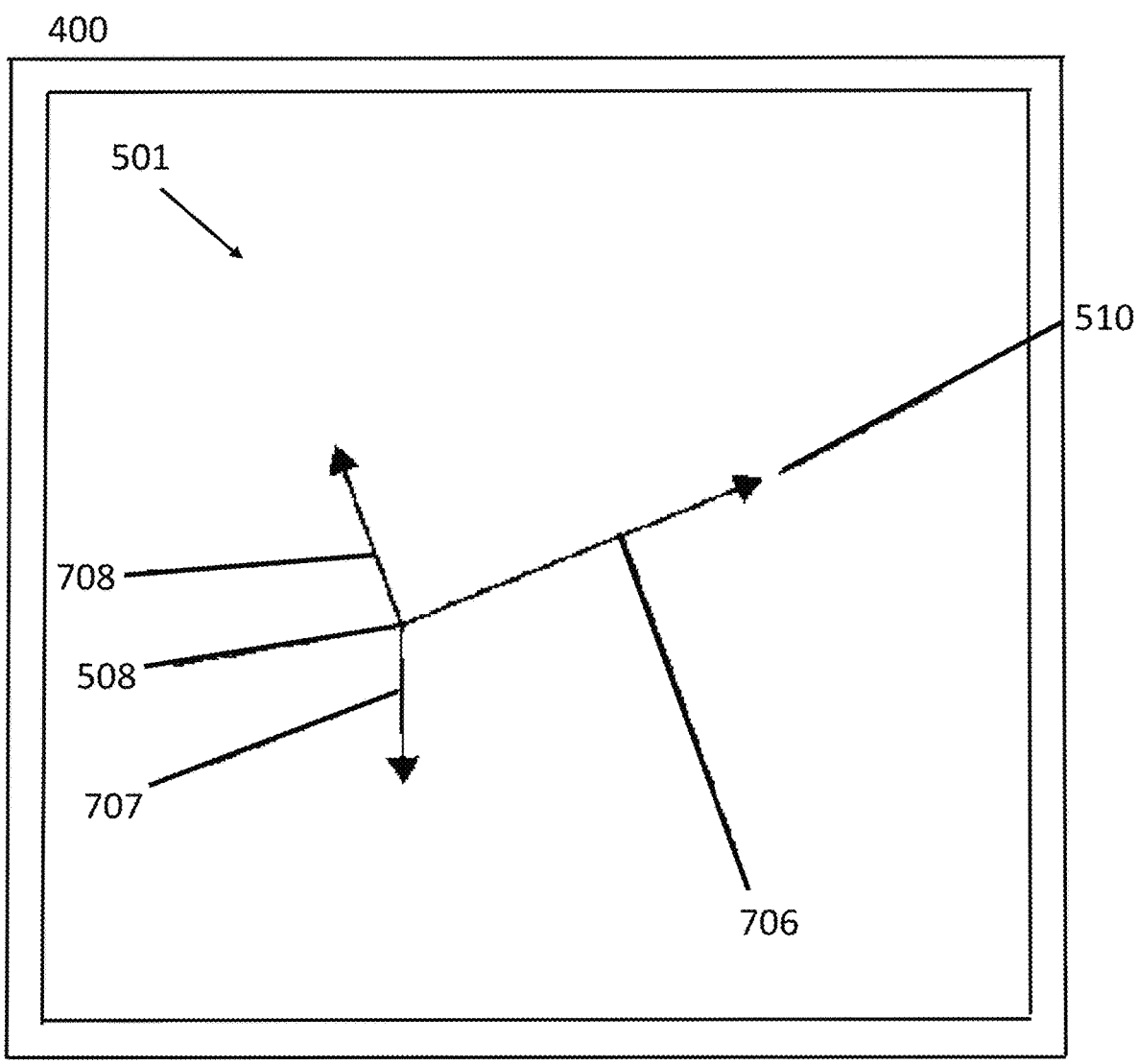
FIG. 7 illustrates a process of calculating vectors and fit handles from coordinates on a target surface used to create a target surface transform matrix for fitting the graft surface onto a target surface, according to an example embodiment of the present inventive concept.

FIG. 7 illustrates how a "target surface transformation matrix" Mt can be constructed, according to an example embodiment of the present inventive concept. Referring to FIG. 7, the surface coordinates [508], [510] on the target mesh surface 501, which are associated respectively with, and defined using the fit handles [503], [505] on the graft surface, can be used to create a target surface transformation matrix Mt using three orthogonal vectors [706], [707], [708]. It is to be noted that an important part of the fitting process is to make sure that the surface coordinates [508], [510] on the target mesh surface will be aligned with fit handles [503], [505] of the graft surface so that the target mesh surface coordinates [508], [510] and the graft surfaces coordinates [503], [505] are the same in 3D space. The three orthogonal vectors [706], [707], [708], referred to as a "right" vector Rt [706], a "forward" vector Ft [707], and an "up" vector Ut [708], can be calculated as follows. Two fit handles (i.e., [508], [510]) on the target surface 501 can be used to obtain a "right" 3D vector Rt [706] by subtracting the geometric points of the surface coordinates [510], [508] on the target surface. A graft surface normal vector can be obtained at each of the two fit handles [508], [510] and averaged (a+b)/2) to obtain a "forward" 3D vector Ft [707], and the cross product of the "right" vector R [706] and the "forward" vector F [707] vector will yield an "up" vector Ut [708].

Once the right vector Rt [706], the forward vector Ft [707] and the up vector Ut [708] are determined, a 3×4 target surface coordinate transform matrix Mt can be constructed as follows. Using the first fitted handle point [508] on the target surface 501, the normalized "right" vector Rt [706] is set to be the transform matrix's first row, the normalized "forward" vector Ft [707] is set to be the transform matrix's second row, the normalized "up" vector Ut [708] is set to be the transform matrix's third row, and a vector Pt is set to be the transform matrix's fourth row. The 3D cartesian coordinates of vector Pt can be calculated by using the surface coordinate of the first fit handle and using the 3D cartesian coordinates of mesh vertices. As stated above, the target surface coordinate transformation matrix Mt can be constructed from the four vectors [Rx Ry Rz], [Fx Fy Fz], [Ux Uy Uz], and [Px Py Pz]. In other words, the components of vector Rt form the first row of the matrix Mt, the components of vector Ft form the second row of the matrix Mt, the components of the Vector Ut form the third row of the matrix Mt, and the components of the vector Pt form the fourth row of the target surface coordinate transformation matrix Mt. Similar to the construction of the graft surface coordinate transformation matrix Mg, as described above, each of the vectors Rt, Ft and Ut should be normalized.

The length of the "right" vector Rg [606] on the graft surface 402 can be divided by the length of the "right" vector Rt [706] on the target surface 501 to yield a "scaling factor." The graft surface coordinate transformation matrix Mg can be multiplied by this scaling factor, and the result of this multiplication can then be multiplied by the inverse target surface coordinate transformation matrix Mt to produce a "graft to target transformation matrix Mgt."

The geometric coordinates [512] of the graft surface (i.e., see FIG. 5) can be multiplied by the graft to target transformation matrix Mgt to convert the graft surface geometric coordinates [512] to target surface geometric coordinates. The target surface geometric coordinates can then be surface projected onto the target surface 501 to yield the target surface coordinates for the target surface 501.

The following describes optional additional steps that can be performed in the case where a user may not be 100% satisfied with all the determined target surface coordinates, according to another example embodiment of the present inventive concept. In other words, manual adjustments can be performed to refine the fitted graft surface coordinates through a fitted graft surface refinement process as described below. In accordance with this additional adjustment process, one or more fitted graft surface points may be selected and transformed (rotated, translated, scaled) by a user through a user interface (UI) screen in object-space. The topology of the graft surface can be used to find vertices (point coordinates) which are direct neighbors of the selected vertices. This can be achieved by assigning attenuated weight values to the neighbors of the selected vertices. This process can be repeated by a user at the UI a specified number of times to find additional neighbors of neighbors iteratively, assigning a smaller weight value to the detected neighbor set at each iteration. The assigned weights can be used to transform the detected neighbor vertices using their weight to reduce the magnitude of transformation. This process is commonly referred to as "soft selection." After the vertex positions are adjusted by a user at the UI and "soft selection" is performed, the modified object coordinates are surface projected to the target surface to yield updated fitted graft surface coordinates.

This graft surface coordinate fitting process generates a plurality of surface coordinates on the target surface, which place graft surface points/vertices onto the target surface. These surface coordinates are stored in a computer memory and in the current display on the UI such that during any deformations of the target surface these surface coordinates can be used to update the geometry of the fitted graft surface.

Referring to FIGS. 4B-4E, a plurality of graft grooms 410 (containing the topology hash of its corresponding selected graft surface base) are illustrated on the GUI 400 for a user to view and select (see FIG. 4B). The user can select a graft groom 410 from the list of graft grooms 410 by positioning the shaded box 410a over the graft groom 410 to be selected, and can then click on the "select graft groom" button 408. The selected graft groom 410 will be evaluated (processed) given the fitted and transformed graft surface 402 as its base input to generate a final hair model. FIG. 4E illustrates a final hair model 412 of an eyebrow, which is evaluated (i.e., executed or processed) from the selected graft groom 410 in FIG. 4B corresponding with the selected graft surface 402. As described previously, the graft grooms 410 illustrated in the displayed graft groom library were created using the corresponding graft surface's calculated topology hash and fit handles, and the provided graft groom description. It is to be noted that since graft grooms are not affected by the geometry of a graft surface, but only require the topology to remain constant, the hair model generated from the selected graft groom 410 can be modified/adjusted as desired after the corresponding graft surface 402 is fitted and transformed onto a target surface 501.

With the above-described processes, even after a selected graft surface 402 is fitted on top of a target surface 501, a user can generate hair on the graft surface, but the graft surface with the generated hair fits on top of the target surface, making these modifiable hair models very reusable. Further, a plurality of different graft grooms can be defined for a given graft surface 402. Then, since a created graft surface 402 can fit onto any number of target surfaces 501, a user can swap between the plurality of different graft grooms defined for the base graft surface 402.

A Process of Creating Graft Surface Files and Graft Groom Files, Categorizing Graft Surface Files and Graft Groom Files, Placing a Created Graft Surface on a Target Surface, Selecting a Created Graft Groom Corresponding with a Created Graft Surface, and Evaluating Graft Grooms According to Example Embodiments of the Present Inventive Concept Processes of creating and categorizing "graft surface files" and graft groom files," fitting and transforming a created graft surface on a target surface, selecting a created graft groom corresponding with a created graft surface as its base, and evaluating a graft groom to create a hair model, according to example embodiments of the present inventive concept, are described below.

The above-identified processes according to example embodiments herein can be stored on at least one digital non-transient computer-readable storage medium as computer readable codes, and at least one computer processor according to an example embodiment is configured to process these specifically designed computer-readable codes that perform these processes. More specifically, the at least one computer processor according to an example embodiment is configured to create characters and perform all aspects of hair generation and grooming of the characters in the field of digital computer graphics technology.

First, one or more pre-modeled surface models can be imported from a digital content creation (DCC) app into the at least one computer processor and stored in a corresponding at least one digital storage medium. The number of vertices obtained from the imported pre-modeled surface models should be kept to a minimum while defining enough detail to accommodate possible target mesh deformation. The at least one electronic storage/memory is provided to store the computer-readable codes that perform the processes according to the example embodiments of the present inventive concept, as well as to store data of imported surface models, target surfaces, topology hash algorithms of surface models, graft model algorithms, etc., and calculations as described below. A graphic user interface (GUI) associated with the at least one computer processor provides an interactive display to display the various graft surfaces, graft surface libraries, graft grooms corresponding with the graft surface bases, graft groom files, graft groom libraries, target surfaces, and the various processes as described below.

The pre-modeled surface that are imported can be any surface model, such as, for example, but not limited to, a polygon mesh. Examples of surfaces models to be imported include, for example, a small portion of a character model, such as an area around an eyebrow, a mouth, a mustache, a beard, a scalp, an eyelash, etc., depending on the intent of the user of the surface model. Once a pre-modeled surface model is imported to the at least one computer processor, a topology hash of the surface model can be calculated. A number of well-known algorithms can be used to calculate a topology hash of the surface model without departing from the principles and spirit of the overall present inventive concept. A topology hash of a surface model generally includes a simple data structure (e.g., a 32-bit or 64-bit integer or a short character string) which uniquely represents the topology (how geometric vertices/points are connected together to form a surface model) of a surface model.

According to an example embodiment, a topology hash can be calculated as follows: a polygon mesh can be represented by an array of 3D vertices defining each point of the mesh, such as: [v1, v2, v3, . . . , vn]. This polygon mesh generally also contains a list of polygons, wherein each polygon references a vertex from a previously mentioned vertex list by its index. For example, having a mesh with two polygons, each containing four vertices, such as: polygon 1=[v1, v2, v3, v4], polygon 2=[v5, v6, v7, v8], all of such polygons are used to obtain one long array which contains the vertex indices defining these polygons, such as: [1, 2, 3, 4, 5, 6, 7, 8], which is a simply array of integer numbers. Then a hash function (i.e., a hash algorithm) can be used to convert this array into a single 64-bit integer, which is the resulting topology hash. It is to be noted that one of ordinary skill in the art will understand that several different hash functions can be used to convert such arrays into a single 64-bit integer, such as, for example, the well-known MD5 hash.

The calculated topology hash and two fit handles 1 and 2 (described below) can then be stored in the memory, as a newly created graft surface, along with a description of the newly created graft surface, for future use. A plurality of newly created graft surfaces can be stored in a graft surface library according to an example embodiment of the present inventive concept, as described herein. The graft surface library can be displayed on a GUI for a user to select one of the plurality of created graft surfaces.

Referring to FIG. 4A, a user, via the graphical user interface 400 and a corresponding active pointing device, such as a keyboard and/or mouse, etc., can select one of the created and stored graft surfaces 402 within the graft surface library on the GUI 400 to be used any one of a plurality of target surfaces, which can also be selected from a storage medium. The selected graft surface 402 can then be displayed on the GIU 400, as illustrated in FIG. 6. Fit handles for the selected graft surface 402 can then be generated as follows. A first point on the graft surface 402 can be selected as a first fit handle [503], and then a second point on the graft surface can be selected as a second fit handle [505]. This process of defining fit handles can be performed by clicking on the graft surface 402 with the active pointing device and corresponding cursor, wherein the cursor is displayed on the GUI 400 and operated by the at least one computer processor. The computer processor can then determine the 3D coordinate on the surface where the pointing device was clicked. This step can be performed by calculating a 3D ray starting from a screen coordinate and going along the view's direction until an intersection of this ray and the graft surface is found. The 3D coordinate can then be converted to a "surface coordinate."

As pointed out above, the newly created graft surface 402 can then be stored in a graft surface file that is accessible for future use. An image preview of the graft surface 402 can be rendered and stored in a separate file for convenience of both visually labeling the graft surface 402 and later identifying the graft surface 402 for selection thereof.

A graft groom file can then be created as follows. A user can select and open a graft surface 402 from the graft surface files created by the above-described process. An example of graft surfaces 402 to be selected for use is illustrated at reference number 402a in FIG. 4A. The GUI 400 in FIG. 4A illustrates how a user can place a shaded area 402a (followed by the cursor) over a desired graft surface 402 and then select the desired graft surface 402 by clicking on a "select graft surface" button 403. Once a particular graft surface 402 is selected, a groom model (e.g., a groom algorithm) can be defined as follows. It is well known to those skilled in the art that a groom model is an algorithm which converts a surface model, in this case a graft surface 402, into a hair model. The groom model can be programmed with computer-readable codes or can be defined by digital content creation software (e.g., X-gen, Ornatrix, Houdini). Such digital content creation software can be used to set up a stack or a graph of inter-connected operators responsible for processing the graft surface 402 into a hair groom model. A number of parameters can also be presented on the GUI 400 for the user to choose from if desired to uniquely revise/modify the hair groom model. Such parameters can include, but are not limited to, parameters that change the hair length, hair details, the number of hairs, etc. A user is therefore able to modify the values of such parameters at a later time, when the corresponding graft surface 402 base is fitted and transformed onto a target surface, in order make modifications to the resulting hair groom model.

The surface topology hash (or full surface) of the graft surface 402 can then be saved into a graft groom 410 file together with the defined groom model and a description of the graft groom 410, thus creating a graft groom file (See FIG. 4B). These graft groom files 410 can all be saved into a same directory or into a number of different directories, or can exist as part of a database, and together define a local groom graft library. Furthermore, a plurality of graft grooms 410 can be created for one corresponding graft surface 402 base.

The graft groom files 410 can then be categorized as follows. Files containing graft grooms as generated by the above-described process can then be detected and loaded, and the graft surface topology hash from each can be extracted. It is to be noted that the hash can be stored/loaded in the file's header or in the file name to avoid loading and parsing the whole file.

A map structure can be used to categorize each groom (or its file path) by its graft surface hash. The hash can then act as the map's key and the value of the hash is an array of file names for graft grooms containing the graft surface topology hash.

Graft surface fitting can then be performed. Graft surface fitting occurs when a selected graft surface 402 is placed on a target surface. The computer processor can be operated to display all unique graft surfaces 402 on the GUI 400 for a user to view and choose from by displaying the pre-rendered images 404 of the graft surfaces 402 on the GUI 400, as illustrated in FIG. 4A.

Referring to FIG. 5, a user can select a target surface 501, among a plurality of stored target surfaces, in which to work with to generate hair thereon. Once the target surface 501 and graft surface 402 are selected, a user can align the graft surface 402 over the target surface 501. The previously created fit handles [503], [505] of a selected graft surface 402 can be used to specify points on the target surface 501 to define surface coordinates [508], [510] on the target surface 501. These surface coordinates [508], [510] can be used as fit handles on the target surface 501. Once fit handles for both the graft surface 402 and the target surface 501 are defined, these fit handles can be used to fit the graft surface 402 onto the target surface 501 by the process as described below.

The two fit handles [503], [505] on the graft surface 402 can be used to calculate a "right" 3D vector Rg [606] (having 3 components x,y,z) by subtracting the geometric points of the surface coordinates of the two fit handles [503], [505] on the graft surface 402. A graft surface normal vector can be obtained at each of the two fit handle coordinates [503], [505] and then averaged to produce a "forward" 3D vector Fg [607] (having 3 components x,y,z). As pointed out above, a surface normal vector is generally available as the property of the surface itself (i.e., it may be stored per-face or per-vertex in memory or on a hard drive together with the surface's face and vertex arrays). The cross product of the "right" vector R [606] and the "forward" 3D vector [607] F yields an "up" 3D vector Ug [608] (having 3 components x,y,z). The three obtained normalized vectors (right, forward, up) [606], [607], [608], together with a vector Pg obtained from the first fit handle 503, can then be used to form a graft surface coordinate transformation matrix Mg. For example, a 3×4 transform matrix Mg can be constructed by setting the normalized "right" vector Rg [606] to be the transform matrix's first row, setting the normalized "forward" vector Fg [607] to be the transform matrix's second row, setting the normalized "up" vector Ug [608] to be the transform matrix's third row, and setting a vector Pg, defined by the coordinates of the first fit handle 503 (having 3 components x,y,z), to be the transform matrix's fourth row. One of ordinary skill in the art will understand that a vector is normalized when the following condition is met: $V(x^2+y^2+z^2)=1$. The graft surface coordinate transformation matrix Mg is constructed from the three normalized vectors Rg [Rx Ry Rz]; Fg [Fx Fy Fz]; Ug [Ux Uy Uz]; and vector Pg [Px Py Pz]. In other words, the components of vector Rg can form the first row of the graft surface coordinate transformation matrix Mg, the components of vector Fg can form the second row of the graft surface coordinate matrix Mg, the components of the Vector Ug can form the third row of the graft surface coordinate transformation matrix Mg, and the components of the vector Pg can form the fourth row of the graft surface coordinate transformation matrix Mg. The coordinates of vector Pg can be calculated by using the surface coordinate of the first fit handle [503] and using mesh coordinates to calculate the object-space position of Pg.

It is to be noted that any 3D vector that is multiplied by the graft surface coordinate transformation matrix Mg will be transformed by the matrix. Also, this 3×4 graft surface coordinate transform matrix converts a 3D coordinate in a graft surface's object space into the "world" object space when the 3D coordinate is multiplied by the graft surface coordinate transformation matrix Mg.

Referring to FIG. 7, a target surface coordinate transformation matrix Mt can also be created as follows. The first and second fit handles [508], [510] defined on the target surface 501 can be used to create a target surface coordinate transformation matrix Mt using three calculated orthogonal vectors [706], [707], [708]. The three orthogonal vectors [706], [707], [708], referred to a "right" vector Rt [706], a "forward" vector Ft [707], and an "up" vector Ut [708], can be calculated as follows. The two fit handles [508], [510] on the target surface 501 can be used to obtain a "right" 3D vector Rt [706] by subtracting the geometric points of the surface coordinates [510], [508] on the target surface. A graft surface normal vector can be obtained at each of the two fit handles [508], [510] and averaged (a+b)/2) to obtain a "forward" 3D vector Ft [707], and the cross product of the "right" vector R [706] and the "forward" vector F [707] vector will yield an "up" vector Ut [708].

Once the right vector Rt [706], the forward vector Ft [707] and the up vector Ut [708] are determined, a 3×4 target surface coordinate transform matrix Mt can be constructed as follows. Using the first fitted handle point [508], the normalized "right" vector Rt [706] is set to be the transform matrix's first row, the normalized "forward" vector Ft [707] is set to be the transform matrix's second row, the normalized "up" vector Ut [708] is set to be the transform matrix's third row, and a vector Pt (derived from the data of the first fit handle 508) is set to be the transform matrix's fourth row. The coordinates of vector Pt can be calculated by using the surface coordinate of the first fit handle [508] and using mesh coordinates to calculate the object-space position of P. The target surface coordinate transformation matrix Mt can be constructed from the four vectors [Rx Ry Rz]; [Fx Fy Fz]; [Ux Uy Uz]; and [Px Py Pz]. In other words, the components of vector Rt can form the first row of the matrix Mt, the components of vector Ft can form the second row of the matrix Mt, the components of the Vector Ut can form the third row of the matrix Mt, and the components of the vector Pt can form the fourth row of the matrix Mt.

According to an example embodiment, the length of the "right" vector Rg [606] on the graft surface 402 can be divided by the length of the "right" vector Rt [706] on the target surface 501 to yield a scaling factor. The graft surface transformation matrix Mg can be multiplied by this scaling factor, and the result of this multiplication can then be multiplied by the inverse target surface transformation matrix Mt to produce a "graft to target transformation matrix Mgt."

Referring to FIG. 5, the geometric coordinates (i.e., [512]) of the graft surface 402 can be multiplied by the graft to target transformation matrix Mgt to convert the graft surface geometric coordinates [512] to target surface geometric coordinates. The target surface geometric coordinates can then be surface projected onto the target surface to yield the target surface coordinates for the target surface 501.

This process can be improved by introducing more fit handles and then using these additional fit handles to non-uniformly scale the graft surface.

For each vertex of the graft surface 402 a surface position on the target surface 501 is calculated and stored. For example, the 3D coordinate of each vertex on the graft surface 402 can be multiplied by the graft to target transformation matrix. The new 3D coordinate, which is the result of this multiplication, is then used to find the 3D point on the target surface 501 which is the closest to it. A nearest point algorithm is used to perform this operation (i.e., going over each polygon/triangle which make up the target surface and finding the smallest distance to one of the polygon/triangles with respect to the provided 3D coordinate, and then choosing the point on the polygon/triangle having the smallest distance). The user can then translate the graft groom vertices after placement thereof. For example, the 3D positions of the vertices can be changed by translation, rotation or by scale using the pointing device. The positions of these vertices can then be interactively reprojected onto the target surface 501.

The user can then select a graft groom file 410 from a list of all graft groom files 410 previously generated and stored in the graft groom library, by selecting to display the graft groom library on the GUI 400, as illustrated in FIG. 4B. The selected graft groom file can then be used to generate a final hair model by evaluating (executing) the selected graft groom to obtain the final hair model.

Evaluating a graft groom can be performed as follows. For each subsequent evaluation of a graft groom (for display, rendering, or during parameter changes) the corresponding base graft surface 3D cartesian coordinate positions are updated based on their target surface positions and target 3D cartesian coordinates. The graft groom operators (i.e., various design code functions for performing groom modifications, such as hair shapes, textures, widths, colors, etc.) can then also be evaluated, entering the graft groom's graft surface 402 base information as an input as well as any user-specified parameters of the groom model, to produce the final hair model.

The present general inventive concept can be embodied as computer-readable codes on a non-transient computer-readable medium. The non-transient computer-readable medium can include a computer-readable recording medium and a computer-readable transmission medium. The computer-readable recording medium is any data storage device that can store data as a program which can be thereafter read by a computer system. Examples of the computer-readable recording medium include a semiconductor memory, a read-only memory (ROM), a random-ac-cess memory (RAM), a USB memory, a memory card, a blue-ray disc, CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An improved method of fitting a graft surface onto a target surface for processing a graft groom corresponding with the graft surface on the target surface into hair models, the method comprising:
   using a computer processor and an interactive graphic user interface (GUI) to perform the processes including:
      creating at least one graft surface file from a pre-modeled surface model by calculating a topology hash of the pre-modeled surface model and defining at least first and second fit handles of the surface model to create a graft surface and storing the graft surface together with a graft surface description in the at least one graft surface file within a graft surface library to be selected from the graft surface library;
      creating at least one graft groom corresponding with each created graft surface by generating a groom model using a set of operators configured to generate and modify a hair model from the corresponding created graft surface and storing the groom model, calculated topology hash of the graft surface and a description of the graft groom in a graft groom file within a graft groom library to be selected from the graft groom library;
      selecting a target surface to generate a hair model thereon and aligning the created graft surface over the target surface on the GUI;
      specifying a first surface coordinate on the target surface below the first fit handle on the graft surface to define a first fit handle on the target surface and specifying a second surface coordinate on the target surface below the second fit handle on the graft surface to define a second fit handle on the target surface,
      generating a graft surface coordinate transformation matrix Mg;
      generating a target surface coordinate transformation matrix Mt;
      generating a scaling factor between the graft surface and the target surface;
      multiplying the graft surface coordinate transformation matrix Mg by the scaling factor;
      generating a graft to target transformation matrix Mgt by multiplying the inverse of the target surface coordinate transformation matrix Mt by the result of the multiplication of the graft surface coordinate transform matrix Mg and the scaling factor;
      multiplying geometric coordinates of the graft surface by the graft to target transform matrix Mgt to convert the graft surface geometric coordinates to target surface geometric coordinates;
      projecting the target surface geometric coordinates onto the target surface; and
      selecting from the graft groom library at least one of the created graft grooms corresponding with the selected graft surface to be processed on the target surface.

2. The method according to claim 1, wherein:
   the generating a graft surface coordinate matrix Mg comprises:
      calculating right Rg, forward Fg and up Ug vectors for the first fit handle of the graft surface, calculating a point vector Pg for the first fit handle of the graft surface using 3D cartesian coordinates of the first fit handle and applying normalized components of the right Rg, forward Fg and up Ug vectors and the 3D cartesian coordinates of the point vector Pg of the first fit handle of the graft surface into a matrix Mg;
   the generating a target surface coordinate transformation matrix Mt comprises:
      calculating right Rt, forward Ft and up Ut vectors for the first fit handle of the target surface, calculating a point vector Pt for the first fit handle of the target surface using 3D cartesian coordinates of the first fit handle and applying normalized components of the right Rt, forward Ft and up Ut vectors and the 3D cartesian coordinates of the point vector Pt of the first fit handle of the target surface into a matrix Mt; and
   the generating a scaling factor comprises:
      dividing a length of the right vector Rg by a length of the right vector Rt.

3. The method of claim 1, wherein the defining at least first and second fit handles on the corresponding surface model comprises selecting a first surface coordinate on the surface model as a first fit handle and selecting a second surface coordinate on the surface model as a second fit handle.

4. The method of claim 1, wherein the creating at least one graft surface file from a corresponding basic surface model includes creating a plurality of graft surfaces and storing the plurality of graft surfaces into the graft surface library displayable on the GUI for selection of one of the stored graft surfaces to be fitted and transformed onto a target surface.

5. The method of claim 4, wherein the creating at least one graft groom corresponding with each created graft surface includes creating a plurality of graft grooms corresponding with a created graft surface and storing the plurality of graft grooms into the graft groom library displayable on the GUI for selection therefrom to be processed on the target surface in which the corresponding graft surface is fitted and transformed thereon.

6. The method of claim 1, wherein the topology hash of the pre-modeled surface model is calculated by combining vertices of polygons forming the surface model into an array of integer numbers and converting the array into a single 64-bit integer using a hash algorithm.

7. The method of claim 1, wherein the calculating right, forward and up vectors for the first fit handle of the graft surface and calculating a point vector for the first fit handle of the graft surface is performed by:
   subtracting the geometric points of the surface coordinates of the two fit handles on the graft surface to obtain the right vector Rg;
   obtaining a graft surface normal vector at each of the two fit handle coordinates and averaging the two graft surface normal vectors to obtain the forward vector Fg;
   multiplying the right vector and the forward vector to obtain the up vector Ug; and
   using the 3D cartesian surface coordinates of the first fit handle to obtain the point vector Pg.

8. The method of claim 7, wherein the graft surface coordinate transformation matrix Mg is generated by setting the normalized right vector coordinates to be a first row of a matrix, setting the normalized forward vector coordinates to be a second row of the matrix, setting the normalized up vector coordinates to be a third row of the matrix and setting the coordinates of the point vector to be a fourth row of the matrix.

9. The method of claim 8, wherein the calculating right, forward and up vectors for the first fit handle of the target surface and calculating a point vector for the first fit handle of the target surface is performed by:
   subtracting the geometric points of the target coordinates of the two fit handles on the target surface to obtain the right vector Rt;
   obtaining a target surface normal vector at each of the two fit handle coordinates and averaging the two target surface normal vectors to obtain the forward vector Ft;
   multiplying the right vector Rt and the forward vector Ft to obtain the up vector Ut; and
   using the 3D cartesian surface coordinates of the first fit handle to obtain the point vector Pt.

10. The method of claim 9, wherein the target surface coordinate transformation matrix Mt is generated by setting the normalized right vector Rt coordinates to be a first row of a matrix, setting the normalized forward vector Ft coordinates to be a second row of the matrix, setting the normalized up vector Ut coordinates to be a third row of the matrix and setting the coordinates of the point vector Pt to be a fourth row of the matrix.

11. The method of claim 1, wherein a graft groom library of the created graft grooms corresponding with the selected graft surface is displayed on the GUI after the selected graft surface is transformed onto the target surface for selecting a desired graft groom to be processed on the target surface.

12. A system for fitting a graft surface onto a target surface and processing a graft groom corresponding with the graft surface on the target surface into hair models, the system comprising a computer processor and GUI configured to perform the following processes:
   importing a pre-modeled surface model into a computer processor operating system configured to display, generate and modify hair models on target surfaces of digital characters, as well as display and process other digital character graphics;
   creating at least one graft surface file from the imported pre-modeled surface model by automatically calculating a topology hash of the pre-modeled surface model and defining at least first and second fit handles of the surface model displayed on a GUI using an interactive pointing device, combing the topology hash and fit handles to create a graft surface, and storing the graft surface together with a corresponding graft surface description as a graft surface file in a memory within a graft surface library to be selected therefrom;
   creating at least one graft groom corresponding with each created graft surface by generating a groom model using a set of operators configured to generate and modify a hair model from the corresponding created graft surface and storing the groom model, calculated topology hash of the graft surface and a description of the graft groom in a graft groom file within a graft groom library to be selected therefrom;
   selecting a target surface to generate a hair model thereon and aligning the created graft surface over the target surface on the GUI using the pointing device;
   specifying a first surface coordinate on the target surface below the first fit handle on the graft surface to define a first fit handle on the target surface and specifying a second surface coordinate on the target surface below the second fit handle on the graft surface to define a second fit handle on the target surface;
   generating a graft surface coordinate transformation matrix Mg;
   generating a target surface coordinate transformation matrix Mt;
   generating a scaling factor between the graft surface and the target surface;
   multiplying the graft surface coordinate transformation matrix Mg by the scaling factor;
   generating a graft to target transformation matrix Mgt by multiplying the inverse of the target surface coordinate transformation matrix Mt by the result of the multiplication of the graft surface coordinate transform matrix Mg and the scaling factor;
   multiplying geometric coordinates of the graft surface by the graft to target transform matrix Mgt to convert the graft surface geometric coordinates to target surface geometric coordinates;
   projecting the target surface geometric coordinates onto the target surface; and
   selecting at least one of the created graft grooms corresponding with the selected graft surface to be processed on the target surface.

13. The system according to claim 12, wherein:
   the generating a graft surface coordinate transformation matrix Mg comprises:
      calculating right Rg, forward Fg and up Ug vectors for the first fit handle of the graft surface, calculating a point vector Pg for the first fit handle of the graft surface using 3D cartesian coordinates of the first fit handle and applying the normalized components of the Rg, Fg and Ug vectors and the 3D cartesian coordinates of the Pg vector of the first fit handle of the graft surface to a matrix Mg;

the generating a target surface coordinate transformation matrix Mt comprises:

calculating right Rt, forward Ft and up Ut vectors for the first fit handle of the target surface, calculating a point vector Pt for the first fit handle of the target surface using 3D cartesian coordinates of the first fit handle and applying the normalized components of the Rt, Ft and Ut vectors and the 3D cartesian coordinates of the Pt vector of the first fit handle of the target surface to a matrix Mt; and the generating a scaling factor comprises dividing a length of the right vector Rg of the graft surface by a length of the right vector Rt of the target surface.

14. The system of claim 12, wherein the process of defining at least first and second fit handles on the corresponding surface model comprises displaying the surface model on the GUI and selecting a first surface coordinate on the surface model with the pointing device as a first fit handle and selecting a second surface coordinate on the surface model with the pointing device as a second fit handle.

15. The system of claim 12, wherein the creating at least one graft surface file from a corresponding basic surface model includes creating a plurality of graft surfaces and storing the plurality of graft surfaces into the graft surface library displayable on the GUI for selection of one of the stored graft surfaces to be fitted and transformed onto a target surface.

16. The system of claim 15, wherein the creating at least one graft groom corresponding with each created graft surface includes creating a plurality of graft grooms corresponding with a created graft surface and storing the plurality of graft grooms into the graft groom library displayable on the GUI for selection therefrom to be processed on the target surface in which the corresponding graft surface is fitted and transformed thereon.

17. The system of claim 12, wherein the topology hash of the pre-modeled surface model is calculated by combining vertices of polygons forming the surface model into an array of integer numbers and converting the array into a single 64-bit integer using a hash algorithm.

18. The system of claim 12, wherein the calculating right, forward and up vectors for the first fit handle of the graft surface and calculating a point vector for the first fit handle of the graft surface is performed by: subtracting the geometric points of the surface coordinates of the two fit handles on the graft surface to obtain the right vector Rg; obtaining a graft surface normal vector at each of the two fit handle coordinates and averaging the two graft surface normal vectors to obtain the forward vector Fg; multiplying the right vector and the forward vector to obtain the up vector Ug; and using the 3D cartesian surface coordinates of the first fit handle to obtain the point vector Pg.

19. The system of claim 18, wherein the graft surface coordinate transformation matrix Mg is generated by setting the normalized right vector coordinates to be a first row of a matrix, setting the normalized forward vector coordinates to be a second row of the matrix, setting the normalized up vector coordinates to be a third row of the matrix and setting the coordinates of the point vector to be a fourth row of the matrix.

20. The system of claim 19, wherein the calculating right, forward and up vectors for the first fit handle of the target surface and calculating a point vector for the first fit handle of the target surface is performed by: subtracting the geometric points of the target coordinates of the two fit handles on the target surface to obtain the right vector Rt; obtaining a target surface normal vector at each of the two fit handle coordinates and averaging the two target surface normal vectors to obtain the forward vector Ft; multiplying the right vector Rt and the forward vector Ft to obtain the up vector Ut; and using the 3D cartesian surface coordinates of the first fit handle to obtain the point vector Pt.

21. The system of claim 20, wherein the target surface coordinate transformation matrix Mt is generated by setting the normalized right vector Rt coordinates to be a first row of a matrix, setting the normalized forward vector Ft coordinates to be a second row of the matrix, setting the normalized up vector Ut coordinates to be a third row of the matrix and setting the coordinates of the point vector Pt to be a fourth row of the matrix.

22. The system of claim 12, wherein a graft groom library of the created graft grooms corresponding with the selected graft surface is displayed on the GUI after the selected graft surface is transformed onto the target surface for selecting a desired graft groom to be processed on the target surface.

23. A non-transient computer-readable storage medium comprising instructions executable by a computing device to perform the method according to claim 1.

* * * * *